US011929961B2

(12) United States Patent
Yang et al.

(10) Patent No.: US 11,929,961 B2
(45) Date of Patent: *Mar. 12, 2024

(54) HANDLING COLLISIONS BETWEEN MULTIPLE ACKNOWLEDGEMENT TRANSMISSIONS AND AN UPLINK DATA TRANSMISSION

(71) Applicant: QUALCOMM Incorporated, San Diego, CA (US)

(72) Inventors: Wei Yang, San Diego, CA (US); Yi Huang, San Diego, CA (US); Seyedkianoush Hosseini, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/897,985

(22) Filed: Aug. 29, 2022

(65) Prior Publication Data

US 2023/0096423 A1 Mar. 30, 2023

Related U.S. Application Data

(63) Continuation of application No. 16/838,410, filed on Apr. 2, 2020, now Pat. No. 11,477,000.

(Continued)

(51) Int. Cl.
*H04W 72/04* (2023.01)
*H04L 1/1829* (2023.01)
(Continued)

(52) U.S. Cl.
CPC ............ *H04L 5/023* (2013.01); *H04L 1/1854* (2013.01); *H04L 1/1864* (2013.01);
(Continued)

(58) Field of Classification Search
None
See application file for complete search history.

(56) References Cited

U.S. PATENT DOCUMENTS 9,929,834 B2 3/2018 Chen et al.
9,949,275 B2 4/2018 Chen et al.
(Continued)

FOREIGN PATENT DOCUMENTS

KR 20180122564 A 11/2018
TW 201826771 A 7/2018
(Continued)

OTHER PUBLICATIONS

Taiwan Search Report—TW109111421—TIPO—dated Apr. 27, 2023.

(Continued)

*Primary Examiner* — Brandon M Renner
(74) *Attorney, Agent, or Firm* — Holland & Hart LLP

(57) ABSTRACT

Methods, systems, and devices for wireless communications are described. A base station may transmit a downlink control transmission and multiple downlink data transmissions to a user equipment (UE). The UE may schedule an uplink data transmission based on the downlink control transmission and may schedule transmission acknowledgement messages based on the multiple downlink data transmissions. The UE may identify that the scheduled uplink data transmission overlaps with the scheduled transmission acknowledgement messages. The UE may generate one or more acknowledgement codebooks for transmission of the multiple transmission acknowledgment messages and may multiplex the one or more acknowledgement codebooks with the uplink data transmission on the uplink data channel. In some cases, the UE may multiplex the codebooks based on determining that a set of timing thresholds are satisfied by an earliest of the multiple transmission acknowledgement (Continued)

messages and the uplink data transmission with respect to one or more downlink transmissions.

30 Claims, 20 Drawing Sheets

Related U.S. Application Data

(60) Provisional application No. 62/830,146, filed on Apr. 5, 2019.

(51) Int. Cl.
*H04L 5/00* (2006.01)
*H04L 5/02* (2006.01)
*H04W 28/04* (2009.01)
*H04W 72/1268* (2023.01)

(52) U.S. Cl.
CPC .......... *H04L 5/0007* (2013.01); *H04L 5/0044* (2013.01); *H04L 5/0055* (2013.01); *H04W 28/04* (2013.01); *H04W 72/1268* (2013.01)

(56) References Cited

U.S. PATENT DOCUMENTS

| | | | |
|---|---|---|---|
| 10,085,255 | B2 | 9/2018 | Patel et al. |
| 2019/0223205 | A1 | 7/2019 | Papasakellariou et al. |
| 2019/0246416 | A1 | 8/2019 | Park et al. |
| 2019/0327755 | A1* | 10/2019 | Xiong .................. H04L 5/0046 |
| 2020/0228248 | A1 | 7/2020 | Islam et al. |
| 2020/0322120 | A1 | 10/2020 | Yang et al. |
| 2020/0404692 | A1 | 12/2020 | Yin et al. |
| 2021/0022129 | A1 | 1/2021 | Yuan et al. |
| 2021/0234656 | A1 | 7/2021 | Matsumura et al. |
| 2021/0329674 | A1* | 10/2021 | Matsumura ........... H04L 5/0048 |

FOREIGN PATENT DOCUMENTS

| | | |
|---|---|---|
| WO | WO-2015050743 A1 | 4/2015 |
| WO | WO-2016175981 A1 | 11/2016 |
| WO | WO-2017039889 | 3/2017 |

OTHER PUBLICATIONS

CATT: "CR on UE Procedure for Reporting Multiple UCI Types", 3GPP Draft, 3GPP TSG RAN WG1 Meeting #96, R1-1903807, CR on UE Procedure for Reporting Multiple UCI Types, 3rd Generation Partnership Project (3GPP), Mobile Competence Centre, 650, Route Des Lucioles, F-06921, Sophia-Antipolis Cedex, France, vol. RAN WG1. No. Athens, Greece, Feb. 25, 2019-Mar. 1, 2019, Mar. 3, 2019, (Mar. 3, 2019), XP051691053, 7 Pages, Retrieved from the Internet: URL: http://www.3gpp.org/ftp/tsg%5Fran/WG1%5FRL1/TSGR1%5F96/Docs/R1%2D1903807%2Ezip [retrieved on Mar. 3, 2019] p. 3, line—p. 4, line 21.

Huawei, et al., "UCI Piggyback on PUSCH for URLLC", 3GPP TSG RAN WG1 Meeting #92, 3GPP Draft, R1-1801357, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 17, 2018, XP051397521, 10 Pages, Retrieved from the Internet: URL: http://www.3gpp.org/ftp/tsg%5Fran/WG1%5FRL1/TSGR1%5F92/Docs/ [retrieved on Feb. 17, 2018] figure 2sections 3 and 4, the whole document.

International Preliminary Report on Patentability—PCT/US2020/026539 The International Bureau of WIPO—Geneva, Switzerland, dated Oct. 14, 2021.

International Search Report and Written Opinion—PCT/US2020/026539—ISA/EPO—dated Jul. 13, 2020.

VIVO: "Discussion on eMBB and URLLC UCI Multiplexing", 3GPP Draft, 3GPP TSG RAN WG1 Meeting #93, R1-1806064 Discussion on eMBB and URLLC UCI Multiplexing, 3rd Generation Partnership Project (3GPP), Mobile Competence Centre, 650, Route Des Lucioles, F-06921, Sophia-Antipolis Cedex. F, vol. RAN WG1, No. Busan, Korea, May 21, 2018-May 25, 2018, May 20, 2018 (May 20, 2018), XP051441279, 4 pages, Retrieved from the Internet: URL: http://www.3gpp.org/ftp/Meetings%5F3GPP%5FSYNC/RAN1/Docs/, [retrieved on May 20, 2018], the whole document.

ZTE: "On Scheduling/HARQ Processing Timeline for URLLC", 3GPP Draft, 3GPP TSG RAN WG1 #96, R1-1901770 On Scheduling/HARQ Processing Timeline for URLLC, 3rd Generation Partnership Project (3GPP), Mobile Competence Centre, 650, Route Des Lucioles, F-06921 Sophia-Antipolis Cedex, vol. RAN WG1, No. Athens, Greece, Feb. 25, 2019-Mar. 1, 2019, Feb. 16, 2019 (Feb. 16, 2019), XP051599464, 22 Pages, Retrieved from the Internet: URL: http://www.3gpp.org/ftp/tsg%5Fran/WG1%5FRL1/TSGR1%5F96/Docs/R1%2D1901770%2Ezip, [retrieved on Feb. 16, 2019], figure 5, Section 2.3.2.

\* cited by examiner

PUSCH Resource 205

PUCCH Resource 210

HANDLING COLLISIONS BETWEEN MULTIPLE ACKNOWLEDGEMENT TRANSMISSIONS AND AN UPLINK DATA TRANSMISSION

CROSS REFERENCE

The present Application for Patent is a Continuation of U.S. patent application Ser. No. 16/838,410 by YANG et al, entitled "HANDLING COLLISIONS BETWEEN MULTIPLE ACKNOWLEDGEMENT TRANSMISSIONS AND AN UPLINK DATA TRANSMISSION" filed Apr. 2, 2020, which claims the benefit of U.S. Provisional Patent Application No. 62/830,146 by YANG et al., entitled "HANDLING COLLISIONS BETWEEN MULTIPLE ACKNOWLEDGEMENT TRANSMISSIONS AND AN UPLINK DATA TRANSMISSION," filed Apr. 5, 2019, assigned to the assignee hereof, and expressly incorporated by reference herein.

BACKGROUND

The following relates generally to wireless communications, and more specifically to handling collisions between multiple acknowledgement transmissions and an uplink data transmission.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a base station may transmit one or more physical downlink control channel (PDCCH) transmissions to a UE which may schedule resources for receiving downlink transmissions or transmitting uplink transmissions. If the UE receives a PDCCH scheduling one or more downlink transmissions, the UE may transmit feedback to the base station indicating whether the UE correctly decoded the one or more downlink transmissions. The UE may indicate the feedback in the form of a codebook (e.g., an acknowledgement codebook.

SUMMARY

The described techniques relate to improved methods, systems, devices, and apparatuses that support handling collisions between multiple acknowledgement transmissions and an uplink data transmission. Generally, the described techniques provide for a base station to transmit one or more downlink control transmissions and multiple downlink data transmissions to a user equipment (UE). Some downlink control transmissions may provide the UE with details regarding the downlink data transmissions to be received by the UE. Another downlink control transmission may provide the UE with details regarding an uplink data transmission to be scheduled by the UE. The UE may determine resources for an uplink data transmission based on one of the downlink control transmissions and may determine resources for transmission acknowledgement messages based on the multiple downlink data transmissions. The UE may identify that the scheduled uplink data transmission overlaps with the scheduled transmission acknowledgement messages. The UE may generate one or more acknowledgement codebooks (e.g., hybrid automatic repeat request (HARD) acknowledgement (ACK) codebooks) for transmission of the multiple transmission acknowledgment messages and may multiplex the one or more acknowledgement codebooks with the uplink data transmission on the uplink data channel.

In some cases, the UE may multiplex the one or more acknowledgement codebooks based on determining that a set of timing thresholds are satisfied by an earliest of the multiple transmission acknowledgement messages and the uplink data transmission with respect to a latest downlink data transmission acknowledged by one of the multiple transmission acknowledgement messages and a downlink control channel transmission that schedules uplink transmissions for the slot. Additionally or alternatively, the UE may multiplex the one or more acknowledgement codebooks based on determining whether downlink control information scheduling one or more downlink data transmissions is received after the downlink control transmission that schedules the uplink transmissions for the slot.

In some cases, generating the one or more acknowledgement codebooks may involve separately encoding each of the multiple transmission acknowledgement messages to corresponding coded acknowledgement codebooks, where the corresponding acknowledgement codebooks may be mapped to the uplink data channel. Alternatively, generating the one or more acknowledgement codebooks may involve jointly encoding the multiple transmission acknowledgement messages to a single coded acknowledgement codebook, where the single coded acknowledgement codebook is mapped to the uplink data channel. In either case, the UE may determine a number of bits to insert into a set of separate acknowledgement codebooks or into a concatenation of the set of separate acknowledgement codebooks to form the corresponding acknowledgement codebooks or the single coded acknowledgement codebook. The UE may determine the number of bits based on an uplink downlink assignment indication (DAI) and one or more downlink DAIs.

A method of wireless communication at a UE is described. The method may include identifying that an uplink data transmission scheduled in a slot overlaps with multiple scheduled transmission acknowledgement messages, determining that a set of timing thresholds are satisfied by an earliest of the multiple scheduled transmission acknowledgement messages and the uplink data transmission with respect to a latest downlink data transmission acknowledged by one of the multiple scheduled transmission acknowledgement messages and a downlink control transmission that schedules the uplink data transmission, generating one or more acknowledgement codebooks for transmission of the multiple scheduled transmission acknowledgement messages, and multiplexing, based on the set of timing thresholds being satisfied, the one or more acknowledgement codebooks with the uplink data transmission on an uplink data channel.

An apparatus for wireless communication at a UE is described. The apparatus may include a processor, memory coupled with the processor, and instructions stored in the memory. The instructions may be executable by the processor to cause the apparatus to identify that an uplink data transmission scheduled in a slot overlaps with multiple scheduled transmission acknowledgement messages, determine that a set of timing thresholds are satisfied by an earliest of the multiple scheduled transmission acknowledgement messages and the uplink data transmission with respect to a latest downlink data transmission acknowledged by one of the multiple scheduled transmission acknowledgement messages and a downlink control transmission that schedules the uplink data transmission, generate one or more acknowledgement codebooks for transmission of the multiple scheduled transmission acknowledgement messages, and multiplex, based on the set of timing thresholds being satisfied, the one or more acknowledgement codebooks with the uplink data transmission on an uplink data channel.

Another apparatus for wireless communication at a UE is described. The apparatus may include means for identifying that an uplink data transmission scheduled in a slot overlaps with multiple scheduled transmission acknowledgement messages, determining that a set of timing thresholds are satisfied by an earliest of the multiple scheduled transmission acknowledgement messages and the uplink data transmission with respect to a latest downlink data transmission acknowledged by one of the multiple scheduled transmission acknowledgement messages and a downlink control transmission that schedules the uplink data transmission, generating one or more acknowledgement codebooks for transmission of the multiple scheduled transmission acknowledgement messages, and multiplexing, based on the set of timing thresholds being satisfied, the one or more acknowledgement codebooks with the uplink data transmission on an uplink data channel.

A non-transitory computer-readable medium storing code for wireless communication at a UE is described. The code may include instructions executable by a processor to identify that an uplink data transmission scheduled in a slot overlaps with multiple scheduled transmission acknowledgement messages, determine that a set of timing thresholds are satisfied by an earliest of the multiple scheduled transmission acknowledgement messages and the uplink data transmission with respect to a latest downlink data transmission acknowledged by one of the multiple scheduled transmission acknowledgement messages and a downlink control transmission that schedules the uplink data transmission, generate one or more acknowledgement codebooks for transmission of the multiple scheduled transmission acknowledgement messages, and multiplex, based on the set of timing thresholds being satisfied, the one or more acknowledgement codebooks with the uplink data transmission on an uplink data channel.

In some examples of the method, apparatuses, and non-transitory computer-readable medium described herein, determining that the set of timing thresholds may be satisfied may include operations, features, means, or instructions for determining that a first timing threshold may be satisfied by the earliest of the multiple scheduled transmission acknowledgement messages and the uplink data transmission being at least a first predetermined number of symbols after a last symbol of the latest downlink data transmission acknowledged by one of the multiple transmission acknowledgment messages, and determining that a second timing threshold may be satisfied by the earliest of the multiple scheduled transmission acknowledgement messages and the uplink data transmission being at least a second predetermined number of symbols after a last symbol of the downlink control transmission that schedules the uplink data transmission.

Some examples of the method, apparatuses, and non-transitory computer-readable medium described herein may further include operations, features, means, or instructions for determining that downlink control information scheduling downlink data transmissions may be received before the downlink control transmission that schedules the uplink data transmission, where multiplexing the one or more acknowledgement codebooks with the uplink data transmission may be further based on the downlink control information being received before the downlink control transmission.

Some examples of the method, apparatuses, and non-transitory computer-readable medium described herein may further include operations, features, means, or instructions for determining that downlink control information scheduling one or more downlink data transmissions may be received after the downlink control transmission that schedules the uplink data transmission, where acknowledgement codebooks corresponding to responsive transmission acknowledgement messages associated with the one or more downlink data transmissions received after the downlink control transmission may be not included in generating the one or more acknowledgement codebooks.

In some examples of the method, apparatuses, and non-transitory computer-readable medium described herein, generating the one or more acknowledgement codebooks for transmission of the multiple scheduled transmission acknowledgement messages may include operations, features, means, or instructions for separately encoding each of the multiple scheduled transmission acknowledgement messages to corresponding coded acknowledgment codebooks, where the corresponding acknowledgement codebooks may be each mapped to the uplink data channel.

In some examples of the method, apparatuses, and non-transitory computer-readable medium described herein, generating the one or more acknowledgement codebooks for transmission of the multiple scheduled transmission acknowledgement messages may include operations, features, means, or instructions for jointly encoding the multiple scheduled transmission acknowledgement messages to a single coded acknowledgement codebook, where the single coded acknowledgement codebook may be mapped to the uplink data channel.

Some examples of the method, apparatuses, and non-transitory computer-readable medium described herein may further include operations, features, means, or instructions for receiving a set of first indications of acknowledgement payload size, each of the set of first indications corresponding to one of the multiple scheduled transmission acknowledgement messages and being received via respective downlink control information messages scheduling downlink data transmissions acknowledged by the multiple scheduled transmission acknowledgement messages, and receiving a single second indication of acknowledgement payload size via the downlink control transmission that schedules the uplink data transmission.

In some examples of the method, apparatuses, and non-transitory computer-readable medium described herein, generating the one or more acknowledgement codebooks for transmission of the multiple scheduled transmission acknowledgement messages may include operations, features, means, or instructions for generating a separate acknowledgement codebook for each of the multiple scheduled transmission acknowledgement messages based on respective ones of the set of first indications, and padding at least one or more of the separate acknowledgement codebooks according to the single second indication to generate a set of updated acknowledgement codebooks for multiplexing the one or more acknowledgement codebooks with the uplink data transmission.

Some examples of the method, apparatuses, and non-transitory computer-readable medium described herein may further include operations, features, means, or instructions for concatenating each of the set of updated acknowledgement codebooks prior to multiplexing the one or more acknowledgement codebooks with the uplink data transmission.

In some examples of the method, apparatuses, and non-transitory computer-readable medium described herein, generating the one or more acknowledgement codebooks for transmission of the multiple scheduled transmission acknowledgement messages may include operations, features, means, or instructions for generating a separate acknowledgement codebook for each of the multiple scheduled transmission acknowledgement messages based on respective ones of the set of first indications, concatenating the separate acknowledgement codebooks for each of the multiple scheduled transmission acknowledgement messages, and applying the single second indication to the concatenated acknowledgement codebooks to generate a single updated acknowledgement codebook for multiplexing the one or more acknowledgement codebooks with the uplink data transmission.

In some examples of the method, apparatuses, and non-transitory computer-readable medium described herein, the multiple scheduled transmission acknowledgement messages may be each scheduled to be transmitted via separate physical uplink control channel transmissions within the slot.

In some examples of the method, apparatuses, and non-transitory computer-readable medium described herein, the multiple scheduled transmission acknowledgement messages may be scheduled to be transmitted on a first carrier that may have a higher sub-carrier spacing than that of a second carrier used by the uplink data transmission, and where the multiple scheduled transmission acknowledgement messages may be each scheduled to be transmitted via separate physical uplink control channel transmissions within corresponding slots of the first carrier.

In some examples of the method, apparatuses, and non-transitory computer-readable medium described herein, the multiple scheduled transmission acknowledgement messages and the uplink data transmission may be each associated with a same traffic type.

In some examples of the method, apparatuses, and non-transitory computer-readable medium described herein, the same traffic type may be ultra-reliable low-latency communications traffic.

In some examples of the method, apparatuses, and non-transitory computer-readable medium described herein, the same traffic type may be enhanced mobile broadband traffic.

A method of wireless communication at a base station is described. The method may include transmitting, to a UE, a downlink control transmission scheduling an uplink data transmission for the UE during a slot, transmitting, to the UE, multiple downlink data transmissions that are to be acknowledged by the UE via corresponding multiple transmission acknowledgment messages that are scheduled to at least partially overlap in time with the uplink data transmission, and receiving, from the UE, one or more acknowledgement codebooks corresponding to the multiple transmission acknowledgement messages, where the one or more acknowledgement codebooks are multiplexed with the uplink data transmission based on a set of timing thresholds being satisfied by an earliest of the multiple transmission acknowledgement messages and the uplink data transmission with respect to a latest downlink data transmission of the multiple downlink data transmissions and the downlink control transmission scheduling the uplink data transmission.

An apparatus for wireless communication at a base station is described. The apparatus may include a processor, memory coupled with the processor, and instructions stored in the memory. The instructions may be executable by the processor to cause the apparatus to transmit, to a UE, a downlink control transmission scheduling an uplink data transmission for the UE during a slot, transmit, to the UE, multiple downlink data transmissions that are to be acknowledged by the UE via corresponding multiple transmission acknowledgment messages that are scheduled to at least partially overlap in time with the uplink data transmission, and receive, from the UE, one or more acknowledgement codebooks corresponding to the multiple transmission acknowledgement messages, where the one or more acknowledgement codebooks are multiplexed with the uplink data transmission based on a set of timing thresholds being satisfied by an earliest of the multiple transmission acknowledgement messages and the uplink data transmission with respect to a latest downlink data transmission of the multiple downlink data transmissions and the downlink control transmission scheduling the uplink data transmission.

Another apparatus for wireless communication at a base station is described. The apparatus may include means for transmitting, to a UE, a downlink control transmission scheduling an uplink data transmission for the UE during a slot, transmitting, to the UE, multiple downlink data transmissions that are to be acknowledged by the UE via corresponding multiple transmission acknowledgment messages that are scheduled to at least partially overlap in time with the uplink data transmission, and receiving, from the UE, one or more acknowledgement codebooks corresponding to the multiple transmission acknowledgement messages, where the one or more acknowledgement codebooks are multiplexed with the uplink data transmission based on a set of timing thresholds being satisfied by an earliest of the multiple transmission acknowledgement messages and the uplink data transmission with respect to a latest downlink data transmission of the multiple downlink data transmissions and the downlink control transmission scheduling the uplink data transmission.

A non-transitory computer-readable medium storing code for wireless communication at a base station is described. The code may include instructions executable by a processor to transmit, to a UE, a downlink control transmission scheduling an uplink data transmission for the UE during a slot, transmit, to the UE, multiple downlink data transmissions that are to be acknowledged by the UE via corresponding multiple transmission acknowledgment messages that are scheduled to at least partially overlap in time with the uplink data transmission, and receive, from the UE, one or more acknowledgement codebooks corresponding to the multiple transmission acknowledgement messages, where the one or more acknowledgement codebooks are multiplexed with the uplink data transmission based on a set of timing thresholds being satisfied by an earliest of the multiple transmission acknowledgement messages and the uplink data transmission with respect to a latest downlink data transmission of the multiple downlink data transmissions and the downlink control transmission scheduling the uplink data transmission.

In some examples of the method, apparatuses, and non-transitory computer-readable medium described herein, the set of timing thresholds include a first timing threshold and a second timing threshold, the first timing threshold being satisfied by the earliest of the multiple transmission acknowledgement messages and the uplink data transmission being at least a first predetermined number of symbols after a last symbol of the latest downlink data transmission of the multiple downlink data transmissions, and the second timing threshold being satisfied by the earliest of the multiple transmission acknowledgement messages and the uplink data transmission being at least a second predetermined number of symbols after a last symbol of the downlink control transmission scheduling the uplink data transmission.

Some examples of the method, apparatuses, and non-transitory computer-readable medium described herein may further include operations, features, means, or instructions for receiving one or more acknowledgement codebooks corresponding to the multiple transmission acknowledgement messages and multiplexed with the uplink data transmission may be further based on downlink control information scheduling the multiple downlink data transmissions being received at the UE before the downlink control transmission scheduling the uplink data transmission.

Some examples of the method, apparatuses, and non-transitory computer-readable medium described herein may further include operations, features, means, or instructions for transmitting a downlink control information scheduling at least one of the multiple downlink data transmissions such that the downlink control information may be received at the UE after the downlink control transmission scheduling the uplink data transmission, where ones of the multiple transmission acknowledgement messages that may be responsive to the at least one of the multiple downlink data transmissions may be not included in the one or more acknowledgement codebooks multiplexed with the uplink data transmission received from the UE.

In some examples of the method, apparatuses, and non-transitory computer-readable medium described herein, receiving one or more acknowledgement codebooks corresponding to the multiple transmission acknowledgement messages and multiplexed with the uplink data transmission may include operations, features, means, or instructions for receiving the multiple transmission acknowledgement messages as separately encoded acknowledgement codebooks.

In some examples of the method, apparatuses, and non-transitory computer-readable medium described herein, receiving one or more acknowledgement codebooks corresponding to the multiple transmission acknowledgement messages and multiplexed with the uplink data transmission may include operations, features, means, or instructions for receiving the multiple transmission acknowledgement messages as a jointly encoded acknowledgement codebook.

Some examples of the method, apparatuses, and non-transitory computer-readable medium described herein may further include operations, features, means, or instructions for transmitting a set of first indications of acknowledgement payload size, each of the set of first indications corresponding to one of the multiple transmission acknowledgement messages and being transmitted via respective downlink control information messages scheduling the multiple downlink data transmissions, and transmitting a single second indication of acknowledgement payload size via the downlink control transmission scheduling the uplink data transmission.

In some examples of the method, apparatuses, and non-transitory computer-readable medium described herein, the single second indication may be indicative of acknowledgement payload size for each of the one or more acknowledgement codebooks, and wherein each of the one or more acknowledgement codebooks is a coded acknowledgement codebook.

In some examples of the method, apparatuses, and non-transitory computer-readable medium described herein, the single second indication may be indicative of a single acknowledgement payload size for all of the one or more acknowledgement codebooks.

In some examples of the method, apparatuses, and non-transitory computer-readable medium described herein, the multiple transmission acknowledgement messages may be each scheduled to be transmitted via separate physical uplink control channel transmissions within the slot.

In some examples of the method, apparatuses, and non-transitory computer-readable medium described herein, the multiple transmission acknowledgement messages may be scheduled to be transmitted on a first carrier that may have a higher sub-carrier spacing than that of a second carrier used by the uplink data transmission, and where the multiple transmission acknowledgement messages may be each scheduled to be transmitted via separate physical uplink control channel transmissions within corresponding slots of the first carrier.

In some examples of the method, apparatuses, and non-transitory computer-readable medium described herein, the multiple transmission acknowledgement messages and the uplink data transmission may be each associated with a same traffic type.

In some examples of the method, apparatuses, and non-transitory computer-readable medium described herein, the same traffic type may be ultra-reliable low-latency communications traffic.

In some examples of the method, apparatuses, and non-transitory computer-readable medium described herein, the same traffic type may be enhanced mobile broadband traffic.

DETAILED DESCRIPTION

Figure 1:
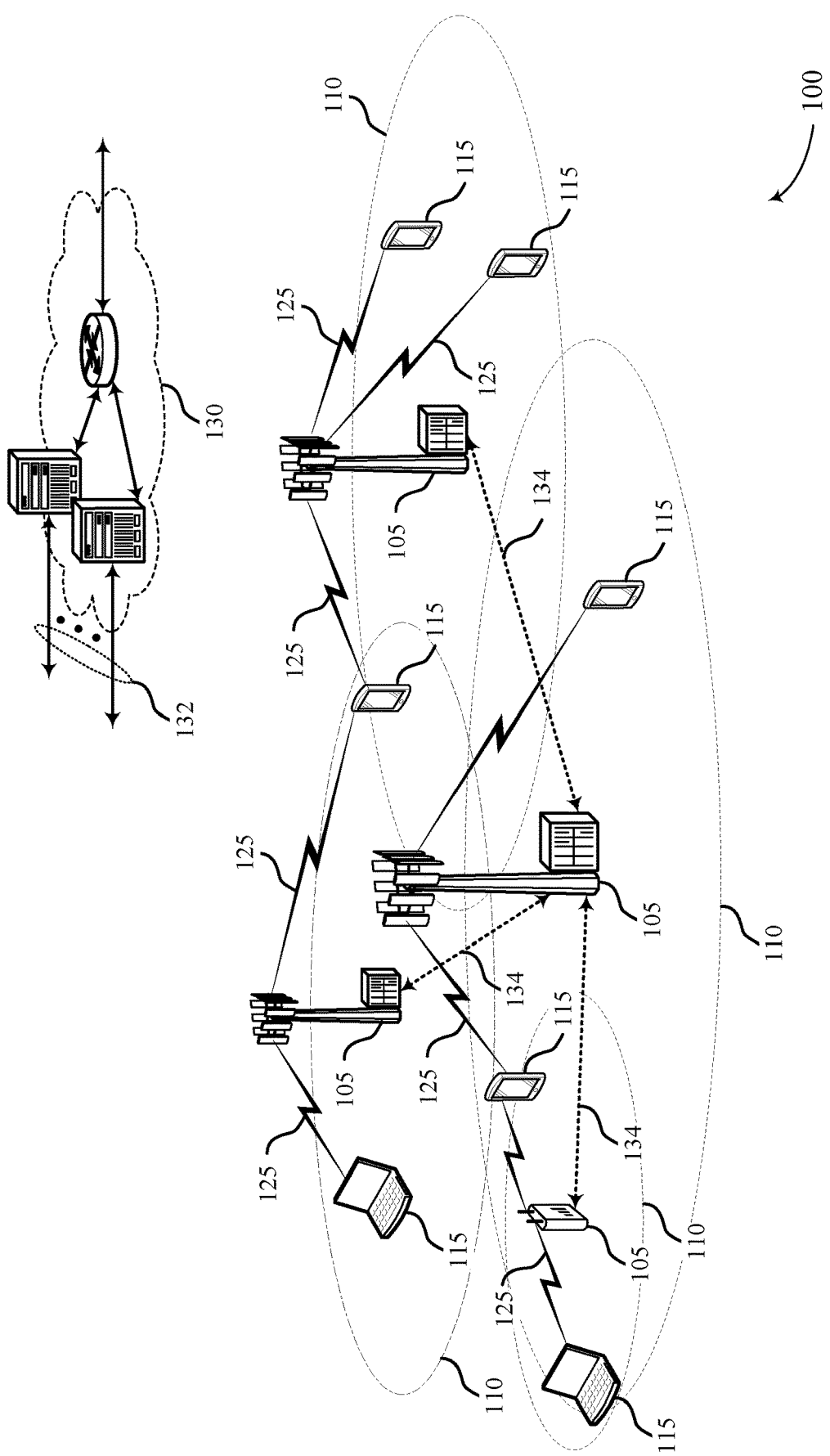
FIG. 1 illustrates an example of a wireless communications system that supports handling collisions between multiple acknowledgement transmissions and an uplink data transmission in accordance with aspects of the present disclosure.

A base station may transmit downlink and uplink grants (e.g., physical downlink control channel (PDCCH) transmissions) to a user equipment (UE) which may schedule resources for receiving downlink transmissions or transmitting uplink transmissions, respectively. If the UE receives a downlink grant scheduling one or more downlink transmissions, the UE may transmit one or more transmission acknowledgement messages (e.g., hybrid automatic repeat request (HARQ) acknowledgements (ACKs)) over a physical uplink control channel (PUCCH) to the base station indicating whether the UE correctly decoded the one or more downlink transmissions. The UE may indicate the HARQ-ACKs in the form of a HARQ-ACK codebook, which may be an example of an acknowledgement codebook. In some cases, a UE may receive an uplink grant scheduling an uplink transmission (e.g., a physical uplink shared channel (PUSCH)) that collides in time (e.g., has overlapping time resources) with a PUCCH resource for transmitting a HARQ-ACK codebook. In such cases, the UE may piggyback the HARQ-ACK codebook associated with the PUCCH resource on the PUSCH.

In some cases, the UE may determine or identify resources for a PUSCH transmission that collides in time with multiple PUCCH resources for transmitting HARQ-ACKs. Such collisions may occur if multiple PUCCH resources are scheduled on a single slot or if a slot associated with the PUCCH resources is smaller than slots associated with PUSCH resources. In either case, resolving the collisions between the PUSCH transmission and the PUCCH resources for transmitting HARQ-ACK may involve piggybacking each of the codebooks onto the PUSCH. One method of piggybacking the codebooks may involve separately encoding each of the HARQ-ACK codebooks and mapping or multiplexing them sequentially to the PUSCH. Another method of piggybacking the HARQ-ACK codebooks may involve concatenating the codebooks together, jointly encoding the HARQ-ACK codebooks, and mapping or multiplexing the encoded concatenated HARQ-ACK codebook to the PUSCH.

In some cases, the uplink and downlink grants may include an uplink downlink assignment indication (DAI) or a downlink DAI, respectively. The UE may use the uplink and downlink DAI to determine a size of a HARQ-ACK codebook to be transmitted by the UE. In some cases, the downlink DAI may be used to determine an initial size of a HARQ-ACK codebook to be used, while the uplink DAI may be used to update the size of the HARQ-ACK codebook to be used (by, for example, adding dummy negative acknowledgements (NACK) bits, if any, to HARQ-ACK codebooks associated with each PUCCH resource or in the concatenated HARQ-ACK codebook). In one example, an uplink grant may include a single uplink DAI to compare against the downlink DAIS associated with each PUCCH resource for transmitting HARQ-ACKs. In such examples, the uplink DAI may indicate the size of each HARQ-ACK codebook. In another example, an uplink grant may include a single uplink DAI to compare against a combined downlink DAI, where the combined downlink DAI may represent a total codebook size after concatenating the HARQ-ACK codebooks but before inserting the dummy NACK bits. In such examples, the uplink DAI may indicate the total codebook size after inserting the dummy NACK bits.

In some cases, the UE may piggyback the multiple HARQ-ACK codebooks to the PUSCH transmission if one or more timeline conditions are satisfied. For instance, the UE may perform the piggybacking if a first symbol of an earliest PUCCH or PUSCH among all overlapping channels starts no earlier than a timing threshold after the last symbol of a physical downlink shared channel (PDSCH) being acknowledged by the multiple HARQ-ACKs. Additionally or alternatively, the UE may perform the piggybacking if a first symbol of an earliest PUCCH or PUSCH among all overlapping channels starts no earlier than a timing threshold after a last symbol of an uplink grant scheduling uplink transmissions such as HARQ-ACK (e.g., over PUCCH) or PUSCH transmissions over a slot. Additionally or alternatively, the UE may perform the piggybacking if the uplink downlink control information (DCI) scheduling the PUSCH transmission arrives after all downlink DCI corresponding to the HARQ-ACK transmissions.

Aspects of the disclosure are initially described in the context of a wireless communications system. Additional aspects of the disclosure may be further described in the context of an additional wireless communications system, an acknowledgement multiplexing scheme, and a process flow. Aspects of the disclosure are further illustrated by and described with reference to apparatus diagrams, system diagrams, and flowcharts that relate to handling collisions between multiple acknowledgement transmissions and an uplink data transmission.

FIG. 1 illustrates an example of a wireless communications system 100 that supports handling collisions between multiple acknowledgement transmissions and an uplink data transmission in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s$=1/30,720,000 seconds. Time intervals of a communications resource may be organized according to radio frames each having a duration of 10 milliseconds (ms), where the frame period may be expressed as $T_f$=307,200 $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A base station 105 may transmit a downlink control transmission and multiple downlink data transmissions to a UE 115. The UE 115 may determine resources for an uplink data transmission based on the downlink control transmission and may determine resources for transmission acknowledgement messages based on the multiple downlink data transmissions. The UE 115 may identify that the scheduled uplink data transmission overlaps with the scheduled transmission acknowledgement messages. The UE 115 may generate one or more acknowledgement codebooks (e.g., HARQ-ACK codebooks) for transmission of the multiple transmission acknowledgment messages and may multiplex the one or more acknowledgement codebooks with the uplink data transmission on the uplink data channel.

In some cases, the UE 115 may multiplex the one or more acknowledgement codebooks based on determining that a set of timing thresholds are satisfied by an earliest of the multiple transmission acknowledgement messages and the uplink data transmission with respect to a latest downlink data transmission acknowledged by one of the multiple transmission acknowledgement messages and a downlink control channel transmission that schedules uplink transmissions for the slot. Additionally or alternatively, the UE 115 may multiplex the one or more acknowledgement codebooks based on determining whether downlink control information scheduling one or more downlink data transmissions is received after the downlink control transmission that schedules the uplink transmissions for the slot.

In some cases, generating the one or more acknowledgement codebooks may involve separately encoding each of the multiple transmission acknowledgement messages to corresponding coded acknowledgement codebooks, where the corresponding acknowledgement codebooks may be mapped to the uplink data channel. Alternatively, generating the one or more acknowledgement codebooks may involve jointly encoding the multiple transmission acknowledgement messages to a single coded acknowledgement codebook, where the single coded acknowledgement codebook is mapped to the uplink data channel. In either case, the UE 115 may determine a number of bits to insert into a set of separate acknowledgement codebooks or into a concatenation of the set of separate acknowledgement codebooks to form the corresponding coded acknowledgement codebooks or the single coded acknowledgement codebook. The UE 115 may determine the number of bits based on an uplink DAI and one or more downlink DAIs.

In this way, UE 115 may, at least in some cases, be able to handle collisions between multiple HARQ-ACK transmissions over resources determined by the UE 115 and an overlapping PUSCH transmission over resources determined by the UE 115. If the UE 115 were not enabled to handle such collisions, the UE 115 could end up dropping most of the HARQ-ACK information, thus leading to otherwise unnecessary retransmissions by the base station 105. For example, in some systems, a UE might only be enabled to multiplex a single HARQ-ACK transmission with a PUSCH transmission. However, in wireless communications system 100, UE 115 is enabled to piggyback multiple HARQ-ACK transmissions onto a PUSCH such that the HARQ-ACK information is not lost.

Figure 2:
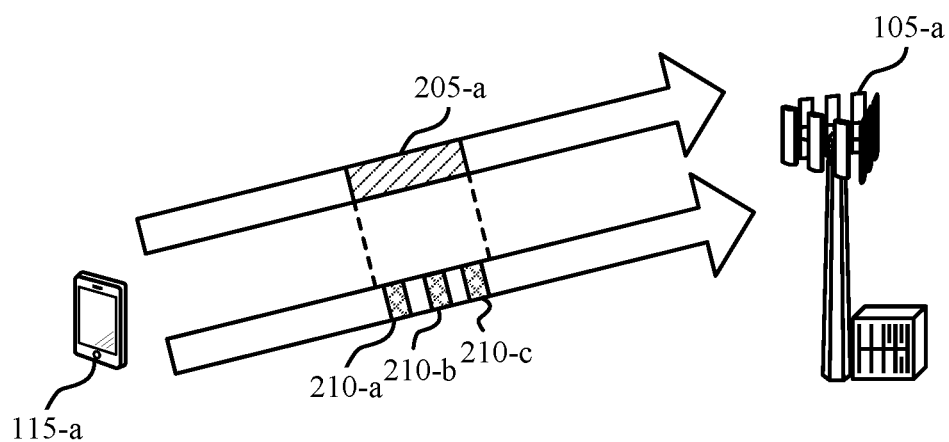
FIG. 2 illustrates an example of a wireless communications system that supports handling collisions between multiple acknowledgement transmissions and an uplink data transmission in accordance with aspects of the present disclosure.
Figure 2:
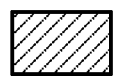
Figure 2:

FIG. 2 illustrates an example of a wireless communications system 200 that supports handling collisions between multiple acknowledgement transmissions and an uplink data transmission in accordance with aspects of the present disclosure. In some examples, wireless communications system 200 may implement aspects of wireless communications system 100. For instance, wireless communications system may include UE 115-a and base station 105-a, which may be examples of a UE 115 and a base station 105, respectively, as described with reference to FIG. 1.

Base station 105-a may transmit downlink and uplink grants to UE 115-a scheduling one or more transmissions for UE 115-a. For instance, if base station 105-a transmits a downlink grant, UE 115-a may determine resources for receiving a PDSCH transmission from the downlink grant and if base station 105-a transmits an uplink grant, UE 115-a may determine resources for transmitting a PUSCH transmission from the uplink grant. The indication of downlink and uplink grants may be included within DCI (e.g., a downlink grant may be indicated via downlink DCI and an uplink grant may be indicated via uplink DCI).

After receiving a downlink DCI scheduling one or more PDSCH transmissions, UE 115-a may transmit one or more HARQ-ACKs to base station 105-a indicating whether UE 115-a correctly decoded the one or more PDSCH transmissions. In one example, UE 115-a may transmit a transmission over a PUCCH resource 210 to base station 105-a indicating a HARQ-ACK for each of the one or more PDSCH transmissions. If a particular one of the one or more PDSCH transmissions was correctly decoded, the PUCCH transmission may contain an ACK for the particular one of the one or more PDSCH transmissions and if the particular one of the one or more PDSCH transmissions was not properly decoded, the PUCCH transmission may contain a NACK for the particular one of the one or more PDSCH transmissions.

In general, the PUCCH transmission may indicate the HARQ-ACKs in the form of a HARQ-ACK codebook. An acknowledgement payload size of the HARQ-ACK codebook may be indicated by a downlink assignment indication (DAI) field of a downlink DCI scheduling the one or more PDSCH transmissions (e.g., a downlink DAI). UE 115-a may generate a HARQ-ACK codebook with the indicated payload size, may encode the HARQ-ACK codebook, and may transmit the HARQ-ACK codebook in the PUCCH transmission.

However, in some cases, UE 115-a may receive an uplink grant scheduling a PUSCH transmission (e.g., over a PUSCH resource 205) that collides in time (e.g., has overlapping time resources) with a PUCCH resource 210 for transmitting a HARQ-ACK codebook. In such cases, UE 115-a may piggyback the HARQ-ACK codebook on the PUSCH transmission. For instance, UE 115-a may include the HARQ-ACK codebook or a modified version of the HARQ-ACK codebook (e.g., a version with dummy NACK bits) in the PUSCH transmission. The uplink grant may include an uplink DCI containing an uplink DAI field. Upon receiving the uplink DCI, UE 115-a may determine whether the payload size indicated by the downlink DAI indicated in the downlink DCI agrees with or is otherwise equivalent to the payload size indicated by the uplink DAI. If the uplink and downlink DAI payload sizes agree (e.g., are equal), UE 115-a may transmit the HARQ-ACK codebook in the PUSCH using the current codebook size. If the uplink and downlink DAI do not agree (e.g., are not equal), UE 115-a may pad dummy NACK bits at the end of the HARQ-ACK codebook until the total size matches the uplink DAI and may transmit the HARQ-ACK codebook with the dummy NACK bits in the PUSCH transmission.

UE 115-a may determine the number of dummy NACK bits to add based on a relationship between the uplink DAI and the downlink DAI. In one example, the uplink and downlink DAIs may be indicated with a same number of bits N, where N may equal a positive integer (e.g., N=2). The number of bits N may map to $2^N$ values (e.g., if N=2, there may be 4 values). If the downlink DAI maps to a value P (e.g., P=3) of the $2^N$ and the uplink DAI maps to a value Q (e.g., Q=3) of the $2^N$, the number of inserted dummy NACK bits may be equal to (Q−P)mod(M), where M may be equal to $2^N$ or may be equal to an integer value independently of $2^N$ (e.g., may equal 4, regardless of N). For instance, if P=2, Q=3, and M=4 then the number of inserted dummy NACK bits may be equal to (3−2)mod 4=1 mod 4=1 dummy NACK. In another example, if P=3, Q=2, and M=4, then the number of inserted dummy NACK bits may be equal to (2−3)mod 4=(−1)mod 4=3 dummy NACK bits inserted.

In other cases, UE 115-a may determine resources for a PUSCH transmission (e.g., a PUSCH resource 205) that collides in time with multiple PUCCH resources 210 for transmitting HARQ-ACKs. Such collisions may occur if UE 115-a transmits multiple HARQ-ACK transmissions in a slot (e.g., transmits multiple HARQ-ACK transmissions per slot). For instance, in the present example, PUSCH resource 205-a and PUCCH resources 210-a, 210-b, and 210-c may span a single slot (e.g., there may be 3 HARQ-ACK transmissions transmitted within a single slot).

Additionally or alternatively, such collisions may occur if a slot length for PUCCH transmissions is smaller than a slot length for PUSCH transmissions. The slot length of a PUCCH transmission (e.g., over PUCCH resource 210) may be smaller than the slot length for a PUSCH transmission (e.g., over PUSCH resource 205) if the transmissions occur on different carriers, and the PUSCH carrier may have a lower sub-carrier spacing (SCS) than the PUCCH carrier. In such cases, two or more slots overlapping a slot containing the PUSCH may contain PUCCH transmissions with HARQ-ACKs. For instance, in the present example, PUSCH resource 205-a may span a single slot within the carrier containing PUSCH resource 205-a and each PUCCH resource 210 may span a single slot within the carrier containing the PUCCH resources 210. However, the slot size associated with PUSCH resource 205-a may be larger than the slot size associated PUCCH resources 210. As such, even if PUCCH resources 210-a, 210-b, and 210-c each span a single slot of their carrier, multiple PUCCH resources 210 may overlap in time with PUSCH resource 205-a.

In either case, to resolve collisions between multiple HARQ-ACK transmissions over PUCCH resources 210 and the PUSCH transmission over PUSCH resource 205-a, UE 115-a may piggyback the HARQ-ACK codebooks associated with the multiple PUCCH resources 210 to the PUSCH transmission. In some cases, UE 115-a may combine the codebooks if the multiple HARQ-ACK feedback and the PUSCH are associated with traffic of the same type (e.g., all are associated with ultra-reliable low-latency communication (URLLC) traffic, or all are associated with enhanced mobile broadband (eMBB) traffic). Generally, the uplink grant may include an uplink DCI with a single uplink DAI. As such, UE 115-a may determine how to insert dummy NACK bits into HARQ-ACK codebooks associated with each PUCCH resource 210 scheduled for a HARQ-ACK transmission or into the concatenated codebook based on the single uplink DAI.

In one example, UE 115-a may separately encode each of the HARQ-ACK codebooks and may map them sequentially to the PUSCH transmission of PUSCH resource 205-a. For instance UE 115-a may generate multiple HARQ-ACK codebooks and may then encode each of the multiple HARQ-ACK codebooks separately. In such cases, the uplink DAI of the uplink DCI in the uplink grant for the PUSCH transmission may indicate HARQ-ACK codebook sizes for each of the PUCCH resources 210 associated with HARQ-ACK transmissions prior to performing separate encoding. UE 115-a may use individual downlink DAI to generate each HARQ-ACK codebook and may use the uplink DAI to insert dummy NACK bits into each codebook. For instance, a downlink DCI scheduling a HARQ-ACK transmission on PUCCH resource 210-a may indicate a DAI with a value $P_1$=2, a downlink DCI scheduling a HARQ-ACK transmission on PUCCH resource 210-b may indicate a DAI with a value $P_2$=5, and a downlink DCI scheduling a HARQ-ACK transmission on PUCCH resource 210-c may indicate a DAI with a value $P_3$=3. If the uplink DAI indicates a value Q=2 and M=4, then a HARQ-ACK codebook generated for PUCCH resource 210-a may receive no additional dummy NACK bits (e.g., $(Q-P_1)$mod(4)=(2−2)mod(4)=0 mod 4=0 bits), a HARQ-ACK codebook generated for PUCCH resource 210-b may receive 1 dummy NACK (e.g., $(Q-P_2)$mod(4)=(2−5)mod(4)=(−3)mod 4=1), and a HARQ-ACK codebook generated for PUCCH resource 210-c may receive 3 dummy NACK bits (e.g., $(Q-P_3)$mod(4)=(2−3)mod(4)=(−1)mod 4=3). After the dummy NACK bits have been inserted, the HARQ-ACK codebook for PUCCH resource 210-a may have a size 2, the HARQ-ACK codebook for PUCCH resource 210-b may have a size 6, and the HARQ-ACK codebook for PUCCH resource 210-c may have a size 6. Upon inserting the dummy NACK bits, the three HARQ-ACK codebooks may be separately encoded and may be mapped sequentially to the PUSCH transmission of PUSCH resource 205-a.

In another example, UE 115-a may concatenate each of the HARQ-ACK codebooks together first to generate a concatenated HARQ-ACK codebook; may jointly encode the concatenated HARQ-ACK codebook; and may map or multiplex the encoded codebook to the PUSCH transmission on PUSCH resource 205-a. For instance, UE 115-a may concatenate a HARQ-ACK codebook generated for PUCCH resource 210-a, a HARQ-ACK codebook generated for PUCCH resource 210-b, and a HARQ-ACK codebook generated for PUCCH resource 210-c. In such cases, the uplink DAI of the uplink DCI in the uplink grant for the PUSCH transmission may indicate HARQ-ACK codebook sizes for each of the multiple HARQ-ACK transmissions prior to concatenation. For instance, a downlink DCI scheduling a HARQ-ACK transmission over PUCCH resource 210-a may indicate a downlink DAI with a value $P_1$=2, a downlink DCI scheduling a HARQ-ACK transmission over PUCCH resource 210-b may indicate a DAI with a value $P_2$=5, and a downlink DCI scheduling a HARQ-ACK transmission over PUCCH resource 210-c may indicate a DAI with a value $P_3$=3. If the uplink DAI indicates a value Q=2 and M=4, then a HARQ-ACK codebook generated for PUCCH resource 210-a may receive no additional dummy NACK bits (e.g., $(Q-P_1)$mod(4)=(2−2)mod(4)=0 mod 4=0 bits), a HARQ-ACK codebook generated for PUCCH resource 210-b may receive 1 dummy NACK (e.g., $(Q-P_2)$mod(4)=(2−5)mod(4)=(−3)mod 4=1), and a HARQ-ACK codebook generated for PUCCH resource 210-c may receive 3 dummy NACK bits (e.g., $(Q-P_3)$mod(4)=(2−3)mod(4)=(−1)mod 4=3). After the dummy NACK bits have been inserted, the HARQ-ACK codebook for PUCCH resource 210-a may have a size 2, the HARQ-ACK codebook for PUCCH resource 210-b may have a size 6, and the HARQ-ACK codebook for PUCCH resource 210-c may have a size 6. After inserting the dummy NACK bits, UE 115-b may concatenate the three HARQ-ACK codebooks, which may have a combined size equal to a sum of the size each of the three HARQ-ACK codebooks (e.g., the concatenated or multiplexed codebook may have a size equal to 2+6+6=14 bits). The concatenated codebook may be jointly encoded and may be mapped or multiplexed to the PUSCH transmission over PUSCH resource 205-a.

Alternatively, the uplink DAI of the uplink DCI in the uplink grant for the PUSCH transmission may indicate the total HARQ-ACK codebook size after concatenation. In such cases, UE 115-a may first generate the multiple HARQ-ACK codebooks according to the individual downlink DAI for each codebook. UE 115-a may then concatenate the multiple HARQ-ACK codebooks and may accumulate the downlink DAIs. If the accumulated downlink DAI does not match the uplink DAI, UE 115-a may pad dummy NACK bits. For instance, a downlink DCI scheduling a HARQ-ACK transmission on PUCCH resource 210-a may indicate a DAI with a value $P_1=2$, a downlink DCI scheduling a HARQ-ACK transmission on PUCCH resource 210-b may indicate a DAI with a value $P_2=5$, and a downlink DCI scheduling a HARQ-ACK transmission on PUCCH resource 210-c may indicate a DAI with a value $P_3=3$. UE 115-a may concatenate the codebooks associated with the transmissions and may combine the DAI values to determine a total value $P_T$ (e.g., $P_T=P_1+P_2+P_3=2+5+3=11$ bits). UE 115-a may then insert a number of dummy NACK bits according to $P_T$, Q, and M. For instance, assuming that M=4, UE 115-a may insert 3 dummy NACK bits (e.g., $(Q-P_T)$ mod(4)=(2−11)mod(4)=(−9)mod(4)=3) into the concatenated codebook. After inserting the 3 dummy NACK bits, the concatenated codebook may have a size of 14 bits. The concatenated codebook may be jointly encoded and mapped to the PUSCH transmission over PUSCH resource 205-a.

In some examples, base station 105-a may perform scheduling such that multiple HARQ-ACKs and/or multiple PUCCH resources 210 do not overlap with a PUSCH resource 205. For instance, base station 105-a may perform the scheduling in such a way that only one HARQ-ACK overlaps with a PUSCH resource 205.

On average, using uplink DAI to indicate total size may cause fewer dummy NACK bits to be inserted into a concatenated codebook than using the uplink DAI to indicate individual codebook size. Alternatively, using uplink DAI to indicate individual codebook size may ensure that each codebook is decoded correctly at base station 105-a, as base station 105-a may be aware that each codebook is the same size and may be able to parse and/or decode the codebooks accordingly.

Figure 3:
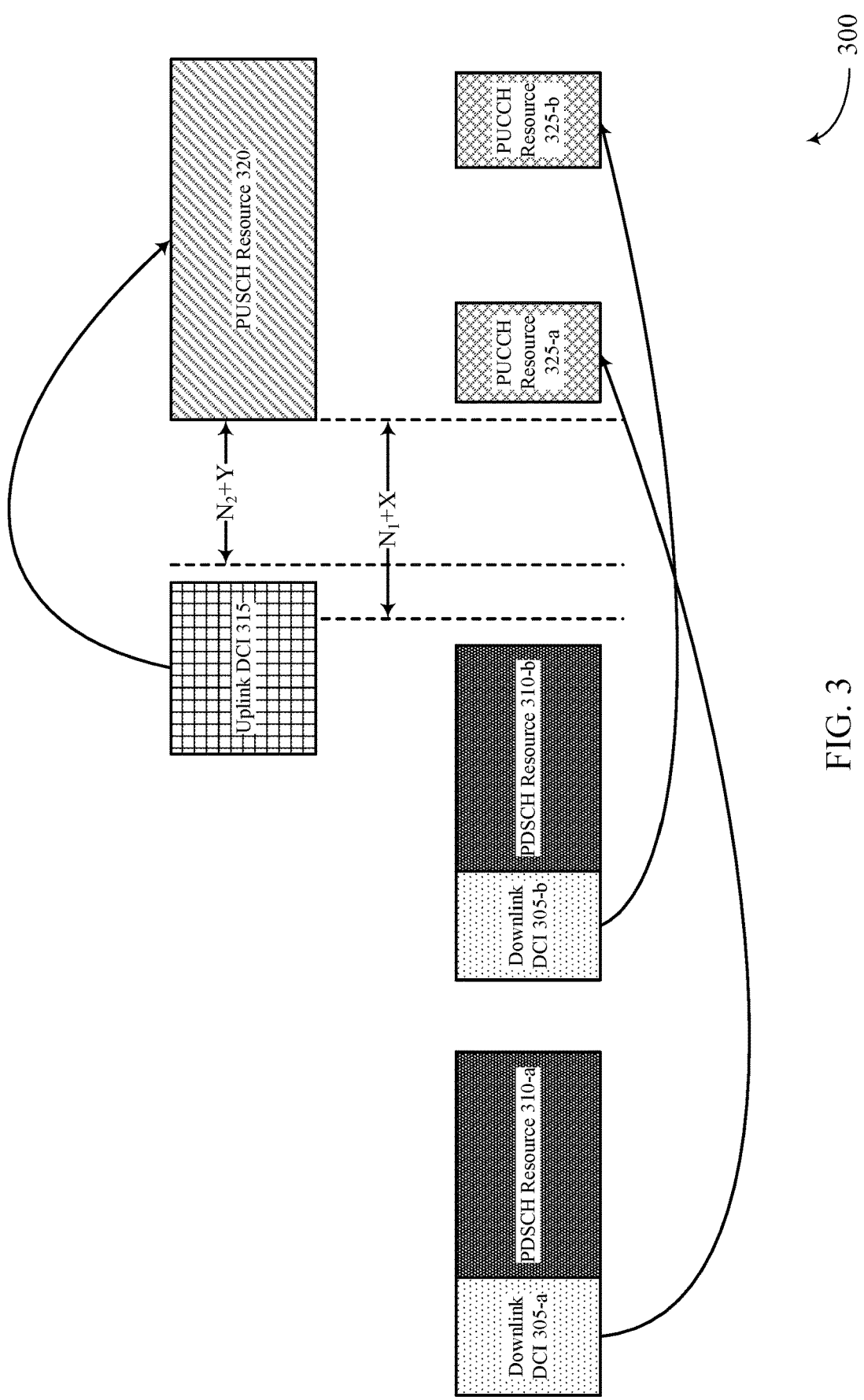
FIG. 3 illustrates an example of an acknowledgement multiplexing scheme that supports handling collisions between multiple acknowledgement transmissions and an uplink data transmission in accordance with aspects of the present disclosure.

FIG. 3 illustrates an example of an acknowledgement multiplexing scheme 300 that supports handling collisions between multiple acknowledgement transmissions and an uplink data transmission in accordance with aspects of the present disclosure. Downlink DCI 305-a may be a downlink grant (e.g., PDCCH) that schedules resources for receiving a PDSCH transmission over PDSCH resource 310-a. A UE 115 may determine to use PUCCH resource 325-a for transmitting one or more HARQ-ACKs for PDSCH resource 310-a in a HARQ-ACK codebook. Downlink DCI 305-b may be a downlink grant that schedules resources for receiving a PDSCH transmission over PDSCH resource 310-b. The UE 115 may determine to use PUCCH resource 325-b for transmitting one or more HARQ-ACKs for PDSCH resource 310-b in a HARQ-ACK codebook. Uplink DCI 315 may be an uplink grant that schedules resources for transmitting a PUSCH transmission over PUSCH resource 320.

In some cases, a UE 115 may multiplex all uplink control information (UCI) (e.g., the HARQ-ACK codebooks associated with PUCCH resources 325-a and 325-b) on a HARQ-ACK transmission over a PUCCH resource 325 or a PUSCH transmission over a PUSCH resource 320 (e.g., as described with reference to FIG. 2). In some cases, the UE 115 may perform the multiplexing if one or both of the following timeline conditions is satisfied. The first timeline condition may be that the first symbol of the earliest PUCCH resource 325 (e.g., PUCCH resource 325-a) or PUSCH resource 320, whichever is earlier, among the overlapping channels starts no earlier than symbol $N_1+X$ after the last symbol of a latest PDSCH (e.g., PDSCH resource 310-b) associated with the set of overlapping PUCCH resources 325-a. The time spanned by $N_1+X$ may be considered a first timing threshold. The second condition may be that the first symbol of the earliest PUCCH resource 325 (e.g., PUCCH resource 325-b) or the PUSCH transmission of PUSCH resource 320, whichever is earlier, among the overlapping channels starts no earlier than $N_2+Y$ symbols after the last symbol of the latest uplink grant (e.g., uplink DCI 315) scheduling uplink transmissions for HARQ-ACK (e.g., over PUCCH resources 325) and/or PUSCH transmission (e.g., over PUSCH resource 320) for the slot containing the PUSCH resource 320. The time spanned by $N_2+Y$ may be considered a second timing threshold. If one or both of these conditions is not satisfied, the UE 115 may determine an error case.

Additionally or alternatively, the UE 115 may multiplex all UCI on a HARQ-ACK transmission over a PUCCH resource 325 or a PUSCH transmission over a PUSCH resource 320 (e.g., as described with reference to FIG. 2) if all downlink DCIs 305 arrive no later than the uplink DCI 315 scheduling the PUSCH transmission over the PUSCH resource 320. If one or more downlink DCIs 305 arrive after the uplink DCI 315, the UE 115 may determine an error case or may discard HARQ-ACK that corresponds to any downlink DCI 305 arriving after the uplink DCI 315. The base station 105 may schedule later HARQ-ACKs not overlapping with the PUSCH resource 320. In some cases, the UE 115 may perform multiplexing if the timeline conditions are satisfied and the downlink DCIs 305 for the slot arrive no later than the uplink DCI 315 scheduling the PUSCH transmission for PUSCH resource 320.

Figure 4:
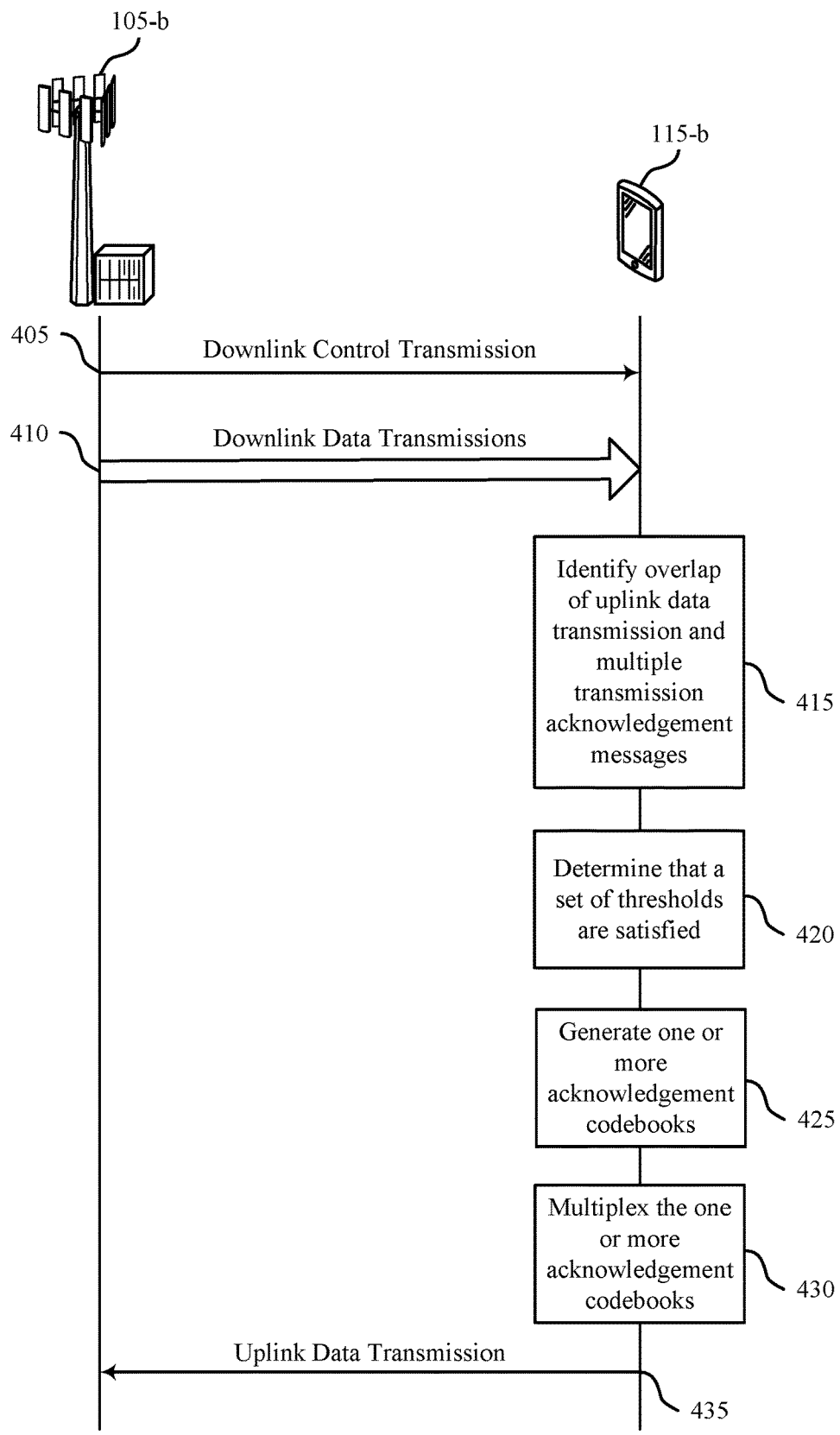
FIG. 4 illustrates an example of a process flow that supports handling collisions between multiple acknowledgement transmissions and an uplink data transmission in accordance with aspects of the present disclosure.

FIG. 4 illustrates an example of a process flow 400 that supports handling collisions between multiple acknowledgement transmissions and an uplink data transmission in accordance with aspects of the present disclosure. In some examples, process flow 400 may implement aspects of wireless communications system 100. For instance, wireless communications system may include UE 115-b and base station 105-b, which may be examples of a UE 115 and a base station 105, respectively, as described with reference to FIG. 1.

At 405, base station 105-b may transmit a downlink control transmission (e.g., a PDCCH transmission containing a downlink DCI). The downlink control transmission may schedule an uplink transmission (e.g., an uplink data transmission, such as a PUSCH) by UE 115-b during a slot. UE 115-b may receive the downlink control transmission. In some cases, the downlink control transmission may include a single indication of acknowledgement payload size.

At 410, base station 105-b may transmit multiple downlink data transmissions (e.g., PDSCH transmissions) to be acknowledged by UE 115-b via corresponding multiple transmission acknowledgement messages (e.g., HARQ-ACK) and which may be scheduled to at least partially overlap in time with the uplink data transmissions. UE 115-b may receive the multiple downlink data transmissions. In some cases, the multiple downlink data transmissions may be scheduled by previously received downlink control transmissions (e.g., PDCCH transmissions including DCI). In some cases, the previously received downlink control channel transmissions may include a set of indications of acknowledgement payload size. Each of the set of indications may correspond to one of the multiple transmission acknowledgement messages.

At 415, UE 115-*b* may identify that an uplink data transmission (e.g., the uplink data transmission scheduled by the downlink control transmission) scheduled for transmission by UE 115-*b* in a slot overlaps with multiple transmission acknowledgement messages also scheduled by UE 115-*b*. The multiple transmission acknowledgement messages may be scheduled to be transmitted over uplink control channel resources (e.g., PUCCH resources). In some cases, the multiple transmission acknowledgement messages may be scheduled to be transmitted via separate PUCCH transmissions within the slot. In other cases, the multiple transmission acknowledgement messages may be scheduled to be transmitted on a first carrier that has a higher sub-carrier spacing than that of a second carrier used by the uplink data transmission. In such cases, the multiple transmission acknowledgement messages may be scheduled to be transmitted via separate PUCCH transmissions within corresponding slots of the first carrier. In some cases, the multiple transmission acknowledgement messages and the uplink data transmission may be associated with the same traffic type. The same traffic type may be, for instance, URLLC traffic or may be eMBB traffic.

At 420, UE 115-*b* may determine that a set of timing thresholds are satisfied by an earliest of the multiple transmission acknowledgement messages and the uplink data transmission with respect to a latest downlink data transmission acknowledged by one of the multiple transmission acknowledgement messages and a downlink control channel transmission that schedules uplink transmissions for the slot. For instance, UE 115-*b* may determine that a first timing threshold is satisfied by the earliest of the multiple transmission acknowledgement messages and the uplink data transmission being at least a first predetermined number of symbols (e.g., $N_1+X$ symbols, as described with reference to FIG. 3) after a last symbol of the latest downlink data transmission acknowledged by one of the multiple transmission acknowledgement messages. Additionally or alternatively, UE 115-*b* may determine that a second timing threshold is satisfied by the earliest of the multiple transmission acknowledgement messages and the uplink data transmission being at least a second predetermined number of symbols (e.g., $N_2+Y$ symbols, as described with reference to FIG. 3) after a last symbol of the downlink control channel transmission that schedules uplink transmissions for the slot.

At 425, UE 115-*b* may generate one or more acknowledgement codebooks (e.g., HARQ-ACK codebooks) for transmission of the multiple transmission acknowledgement messages. In some cases, generating the one or more acknowledgement codebooks may involve separately encoding each of the multiple transmission acknowledgement messages, which may also be referred to as feedback messages, to corresponding coded acknowledgement codebooks, where the corresponding coded acknowledgement codebooks may be mapped to the uplink data channel. For instance, UE 115-*b* may generate multiple unencoded acknowledgement codebooks from the multiple transmission acknowledgement messages and then may encode the multiple unencoded acknowledgement codebooks to generate the corresponding coded acknowledgement codebooks. Alternatively, generating the one or more acknowledgement codebooks may involve jointly encoding the multiple transmission acknowledgement messages to a single coded acknowledgement codebook, where the single coded acknowledgement codebook is mapped to the uplink data channel.

When receiving the set of indications as described with reference to 410, UE 115-*b* may generate a separate acknowledgement codebook for each of the multiple transmission acknowledgement messages. UE 115-*b* may generate the separate acknowledgement codebook based on the set of indications. Additionally, when receiving the indication of acknowledgement payload size at 405, UE 115-*b* may apply the indication to each of the separate acknowledgement codebooks to generate a set of updated acknowledgement codebooks for multiplexing the one or more acknowledgement codebooks with the uplink data transmission. UE 115-*b* may concatenate each of the set of updated acknowledgement codebooks prior to multiplexing the one or more acknowledgement codebooks with the uplink data transmission. Alternatively, after generating the separate acknowledgement codebooks, UE 115-*b* may concatenate the separate acknowledgement codebooks for each of the multiple transmission acknowledgement messages. In such cases, UE 115-*b* may apply the second indication to the concatenated acknowledgement codebooks to generate a single updated acknowledgement codebook for multiplexing the one or more acknowledgement codebooks with the uplink data transmission.

At 430, UE 115-*b* may multiplex the one or more acknowledgement codebooks with the uplink data transmission on an uplink data channel (e.g., a PUSCH). In some cases, UE 115-*b* may multiplex the one or more acknowledgement codebooks with the uplink data transmission based on the set of timing thresholds being satisfied and/or based on determining that DCI scheduling the downlink data transmissions is received before the downlink control transmission that schedules the uplink transmissions for the slot. For instance, UE 115-*b* may perform multiplexing if all of the DCI with associated transmission acknowledgement messages scheduled in the slot are received before uplink DCI scheduling uplink transmissions for the slot. Additionally or alternatively, if UE 115-*b* determines that downlink control information scheduling one or more downlink data transmissions is received after the downlink control transmission that schedules the uplink transmissions for the slot, the acknowledgement codebooks corresponding to response transmission acknowledgement messages associated with the one or more downlink data transmissions received after the downlink control transmission are not included in the multiplexing.

At 435, UE 115-*b* may transmit the uplink data transmission on the uplink data channel. Base station 105-*b* may receive the uplink data transmission. Upon receiving the uplink data transmission, base station 105-*b* may receive, from UE 115-*b*, one or more acknowledgement codebooks corresponding to the multiple transmission acknowledgement messages, where the one or more acknowledgement codebooks may be multiplexed with the uplink data transmission based on the set of timing thresholds being satisfied.

Process flow 400, therefore, provides a method that may enable UE 115-*b* to multiplex multiple HARQ-ACK transmissions on a PUSCH when collisions between the multiple HARQ-ACK transmissions occur with a PUSCH transmission. Through process flow 400, UE 115-*b* may reduce the number of retransmissions used by the base station 105-*b* arising from unreported acknowledgement feedback. This, in turn, may result in more efficient communications and additional power savings at the UE 115-*b*.

Figure 5:
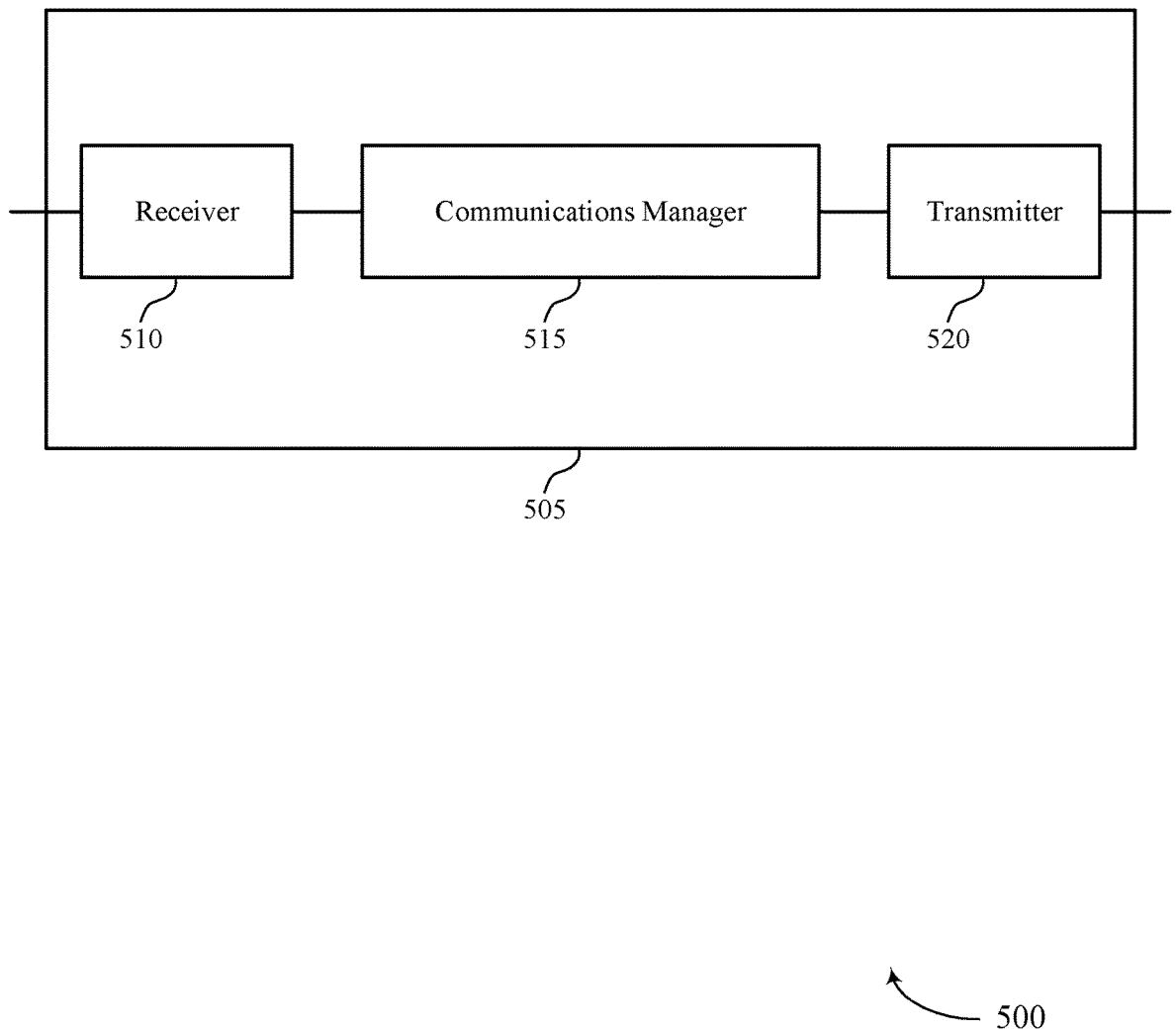
FIGS. 5 and 6 show block diagrams of devices that support handling collisions between multiple acknowledgement transmissions and an uplink data transmission in accordance with aspects of the present disclosure.

FIG. 5 shows a block diagram 500 of a device 505 that supports handling collisions between multiple acknowledgement transmissions and an uplink data transmission in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to handling collisions between multiple acknowledgement transmissions and an uplink data transmission, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify that an uplink data transmission scheduled in a slot overlaps with multiple scheduled transmission acknowledgement messages, determine that a set of timing thresholds are satisfied by an earliest of the multiple scheduled transmission acknowledgement messages and the uplink data transmission with respect to a latest downlink data transmission acknowledged by one of the multiple scheduled transmission acknowledgement messages and a downlink control transmission that schedules the uplink data transmission, generate one or more acknowledgement codebooks for transmission of the multiple scheduled transmission acknowledgement messages, and multiplex, based on the set of timing thresholds being satisfied, the one or more acknowledgement codebooks with the uplink data transmission on an uplink data channel. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
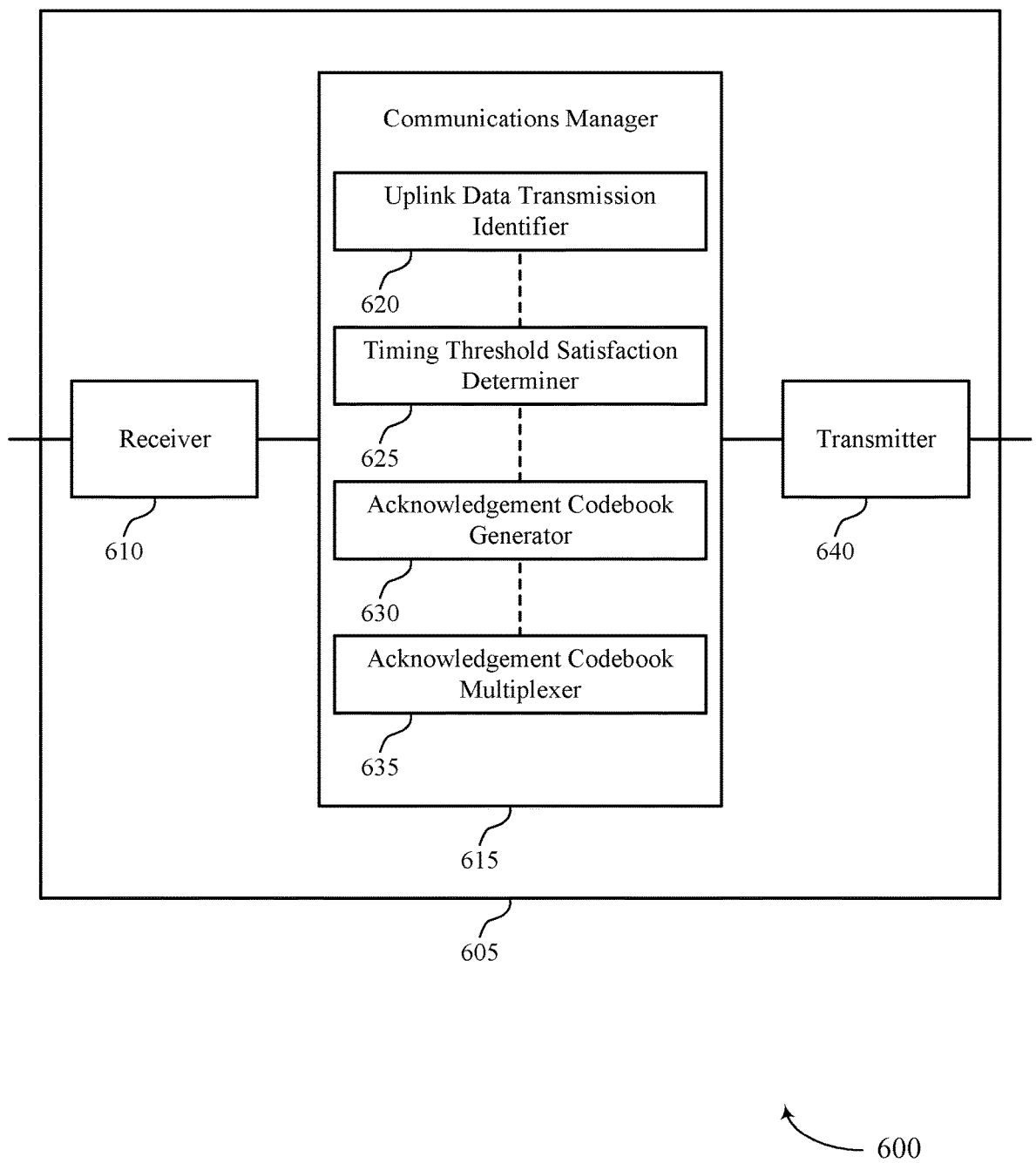

FIG. 6 shows a block diagram 600 of a device 605 that supports handling collisions between multiple acknowledgement transmissions and an uplink data transmission in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to handling collisions between multiple acknowledgement transmissions and an uplink data transmission, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include an uplink data transmission identifier 620, a timing threshold satisfaction determiner 625, an acknowledgement codebook generator 630, and an acknowledgement codebook multiplexer 635. The communications manager 615 may be an example of aspects of the communications manager 810 described herein.

The uplink data transmission identifier 620 may identify that an uplink data transmission scheduled in a slot overlaps with multiple scheduled transmission acknowledgement messages.

The timing threshold satisfaction determiner 625 may determine that a set of timing thresholds are satisfied by an earliest of the multiple scheduled transmission acknowledgement messages and the uplink data transmission with respect to a latest downlink data transmission acknowledged by one of the multiple scheduled transmission acknowledgement messages and a downlink control transmission that schedules the uplink data transmission.

The acknowledgement codebook generator 630 may generate one or more acknowledgement codebooks for transmission of the multiple scheduled transmission acknowledgement messages.

The acknowledgement codebook multiplexer 635 may multiplex, based on the set of timing thresholds being satisfied, the one or more acknowledgement codebooks with the uplink data transmission on an uplink data channel.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
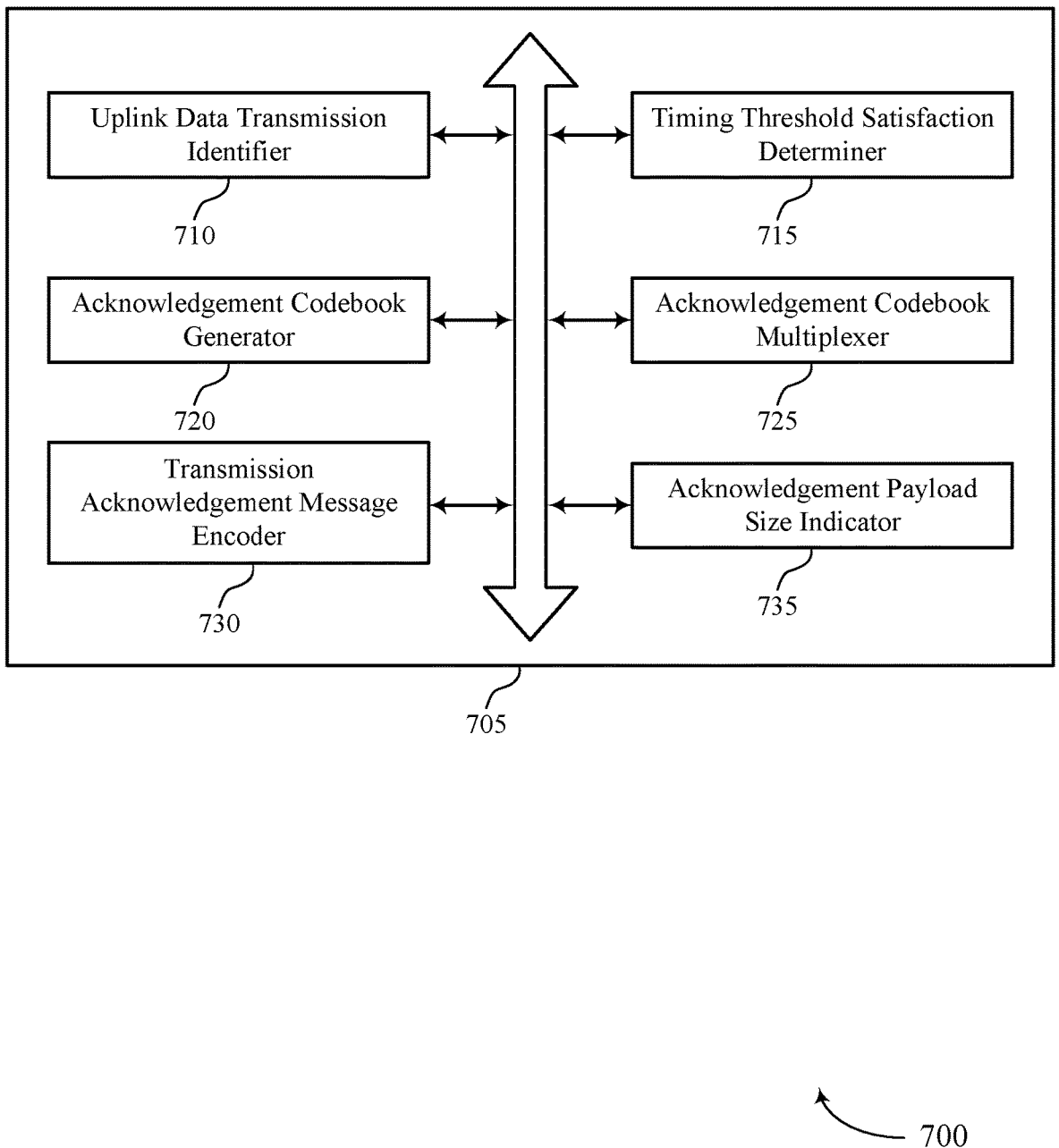
FIG. 7 shows a block diagram of a communications manager that supports handling collisions between multiple acknowledgement transmissions and an uplink data transmission in accordance with aspects of the present disclosure.

FIG. 7 shows a block diagram 700 of a communications manager 705 that supports handling collisions between multiple acknowledgement transmissions and an uplink data transmission in accordance with aspects of the present disclosure. The communications manager 705 may be an example of aspects of a communications manager 515, a communications manager 615, or a communications manager 810 described herein. The communications manager 705 may include an uplink data transmission identifier 710, a timing threshold satisfaction determiner 715, an acknowledgement codebook generator 720, an acknowledgement codebook multiplexer 725, a transmission acknowledgement message encoder 730, and an acknowledgement payload size indicator 735. Each of these modules may communicate, directly or indirectly, with one another (e.g., via one or more buses).

The uplink data transmission identifier 710 may identify that an uplink data transmission scheduled in a slot overlaps with multiple scheduled transmission acknowledgement messages. In some cases, the multiple scheduled transmission acknowledgement messages are each scheduled to be transmitted via separate physical uplink control channel transmissions within the slot. In some cases, the multiple scheduled transmission acknowledgement messages are scheduled to be transmitted on a first carrier that has a higher sub-carrier spacing than that of a second carrier used by the uplink data transmission, and where the multiple scheduled transmission acknowledgement messages are each scheduled to be transmitted via separate physical uplink control channel transmissions within corresponding slots of the first carrier. In some cases, the multiple scheduled transmission acknowledgement messages and the uplink data transmission are each associated with a same traffic type. In some cases, the same traffic type is ultra-reliable low-latency communications traffic. In some cases, the same traffic type is enhanced mobile broadband traffic.

The timing threshold satisfaction determiner 715 may determine that a set of timing thresholds are satisfied by an earliest of the multiple scheduled transmission acknowledgement messages and the uplink data transmission with respect to a latest downlink data transmission acknowledged by one of the multiple scheduled transmission acknowledgement messages and a downlink control transmission that schedules the uplink data transmission. In some examples, the timing threshold satisfaction determiner 715 may determine that a first timing threshold is satisfied by the earliest of the multiple scheduled transmission acknowledgement messages and the uplink data transmission being at least a first predetermined number of symbols after a last symbol of the latest downlink data transmission acknowledged by one of the multiple transmission acknowledgment messages. In some examples, the timing threshold satisfaction determiner 715 may determine that a second timing threshold is satisfied by the earliest of the multiple scheduled transmission acknowledgement messages and the uplink data transmission being at least a second predetermined number of symbols after a last symbol of the downlink control transmission that schedules uplink transmissions for the slot.

The acknowledgement codebook generator 720 may generate one or more acknowledgement codebooks for transmission of the multiple scheduled transmission acknowledgement messages. In some examples, the acknowledgement codebook generator 720 may generate a separate acknowledgement codebook for each of the multiple scheduled transmission acknowledgement messages based on respective ones of the set of first indications. In some examples, the acknowledgement codebook generator 720 may pad at least one or more of the separate acknowledgement codebooks according to the single second indication to generate a set of updated acknowledgement codebooks for multiplexing the one or more acknowledgement codebooks with the uplink data transmission. In some examples, the acknowledgement codebook generator 720 may concatenate each of the set of updated acknowledgement codebooks prior to multiplexing the one or more acknowledgement codebooks with the uplink data transmission. In some examples, the acknowledgement codebook generator 720 may generate a separate acknowledgement codebook for each of the multiple scheduled transmission acknowledgement messages based on respective ones of the set of first indications. In some examples, the acknowledgement codebook generator 720 may concatenate the separate acknowledgement codebooks for each of the multiple scheduled transmission acknowledgement messages. In some examples, the acknowledgement codebook generator 720 may apply the single second indication to the concatenated acknowledgement codebooks to generate a single updated acknowledgement codebook for multiplexing the one or more acknowledgement codebooks with the uplink data transmission.

The acknowledgement codebook multiplexer 725 may multiplex, based on the set of timing thresholds being satisfied, the one or more acknowledgement codebooks with the uplink data transmission on an uplink data channel. In some examples, the acknowledgement codebook multiplexer 725 may determine that downlink control information scheduling downlink data transmissions is received before the downlink control transmission that schedules the uplink transmissions for the slot, where multiplexing the one or more acknowledgement codebooks with the uplink data transmission is further based on the downlink control information being received before the downlink control transmission. In some examples, the acknowledgement codebook multiplexer 725 may determine that downlink control information scheduling one or more downlink data transmissions is received after the downlink control transmission that schedules the uplink transmissions for the slot, where acknowledgement codebooks corresponding to responsive transmission acknowledgement messages associated with the one or more downlink data transmissions received after the downlink control transmission are not included in generating the one or more acknowledgement codebooks.

The transmission acknowledgement message encoder 730 may separately encode each of the multiple scheduled transmission acknowledgement messages to corresponding coded acknowledgment codebooks, where the corresponding acknowledgement codebooks are each mapped to the uplink data channel. In some examples, the transmission acknowledgement message encoder 730 may jointly encode the multiple scheduled transmission acknowledgement messages to a single coded acknowledgement codebook, where the single coded acknowledgement codebook is mapped to the uplink data channel. The acknowledgement payload size indicator 735 may receive a set of first indications of acknowledgement payload size, each of the set of first indications corresponding to one of the multiple scheduled transmission acknowledgement messages and being received via respective downlink control information messages scheduling downlink data transmissions acknowledged by the multiple scheduled transmission acknowledgement messages. In some examples, the acknowledgement payload size indicator 735 may receive a single second indication of acknowledgement payload size via the downlink control transmission that schedules the uplink transmissions for the slot.

Figure 8:
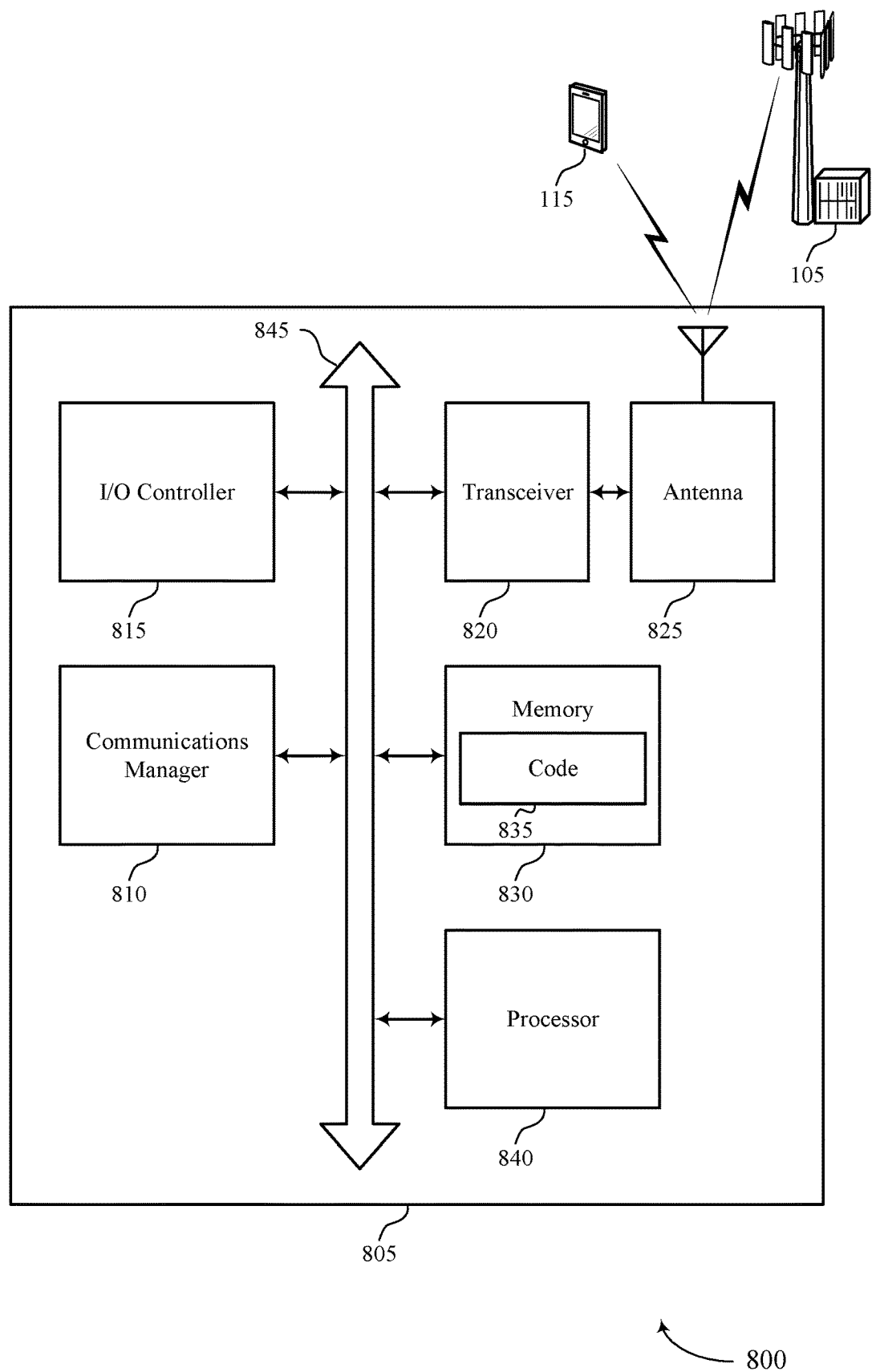
FIG. 8 shows a diagram of a system including a device that supports handling collisions between multiple acknowledgement transmissions and an uplink data transmission in accordance with aspects of the present disclosure.

FIG. 8 shows a diagram of a system 800 including a device 805 that supports handling collisions between multiple acknowledgement transmissions and an uplink data transmission in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify that an uplink data transmission scheduled in a slot overlaps with multiple scheduled transmission acknowledgement messages, determine that a set of timing thresholds are satisfied by an earliest of the multiple scheduled transmission acknowledgement messages and the uplink data transmission with respect to a latest downlink data transmission acknowledged by one of the multiple scheduled transmission acknowledgement messages and a downlink control transmission that schedules the uplink data transmission, generate one or more acknowledgement codebooks for transmission of the multiple scheduled transmission acknowledgement messages, and multiplex, based on the set of timing thresholds being satisfied, the one or more acknowledgement codebooks with the uplink data transmission on an uplink data channel.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting handling collisions between multiple acknowledgement transmissions and an uplink data transmission).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
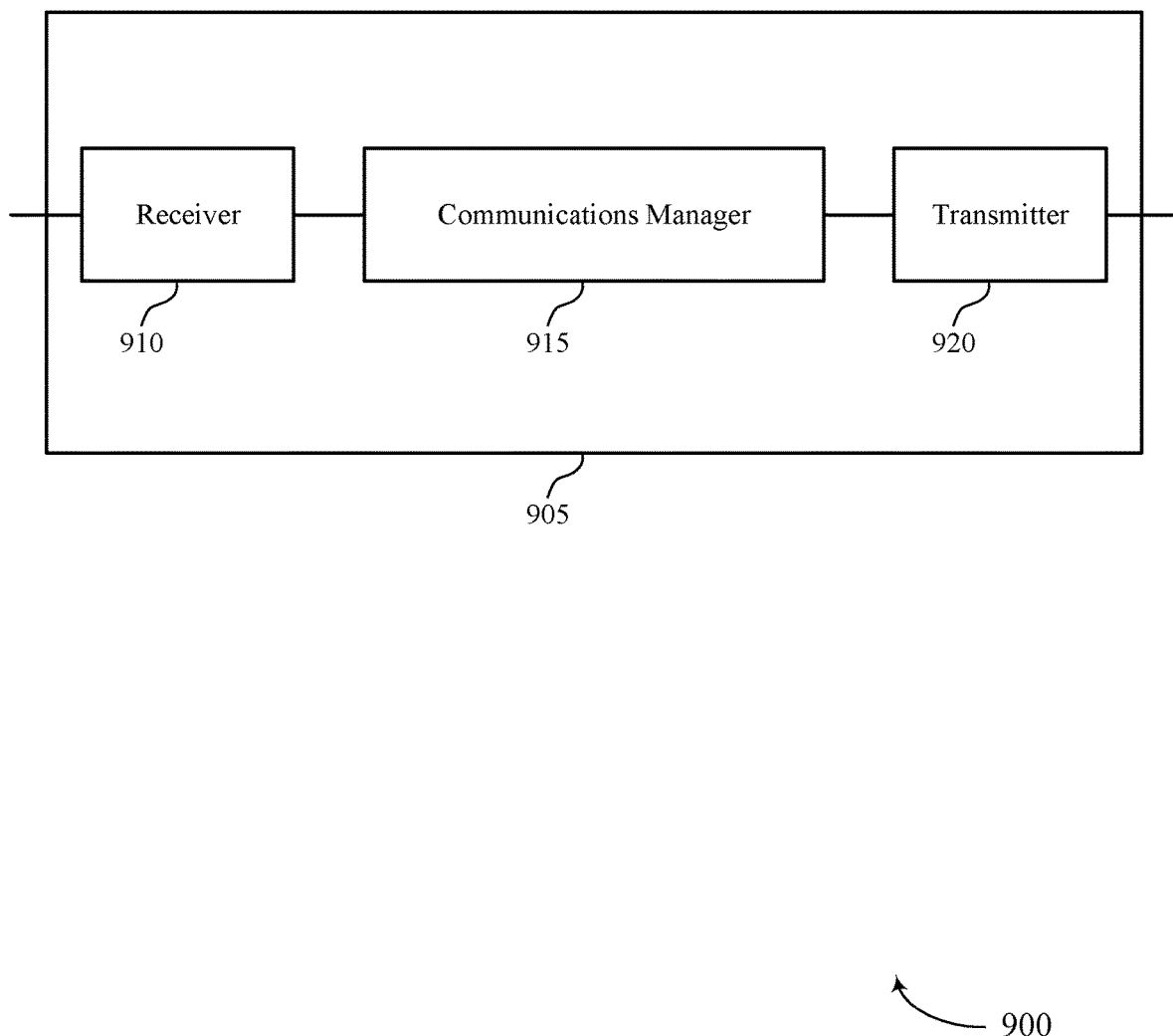
FIGS. 9 and 10 show block diagrams of devices that support handling collisions between multiple acknowledgement transmissions and an uplink data transmission in accordance with aspects of the present disclosure.

FIG. 9 shows a block diagram 900 of a device 905 that supports handling collisions between multiple acknowledgement transmissions and an uplink data transmission in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to handling collisions between multiple acknowledgement transmissions and an uplink data transmission, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to a UE, a downlink control transmission scheduling an uplink data transmission for the UE during a slot, transmit, to the UE, multiple downlink data transmissions that are to be acknowledged by the UE via corresponding multiple transmission acknowledgment messages that are scheduled to at least partially overlap in time with the uplink data transmission, and receive, from the UE, one or more acknowledgement codebooks corresponding to the multiple transmission acknowledgement messages, where the one or more acknowledgement codebooks are multiplexed with the uplink data transmission based on a set of timing thresholds being satisfied by an earliest of the multiple transmission acknowledgement messages and the uplink data transmission with respect to a latest downlink data transmission of the multiple downlink data transmissions and the downlink control transmission scheduling the uplink data transmission. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
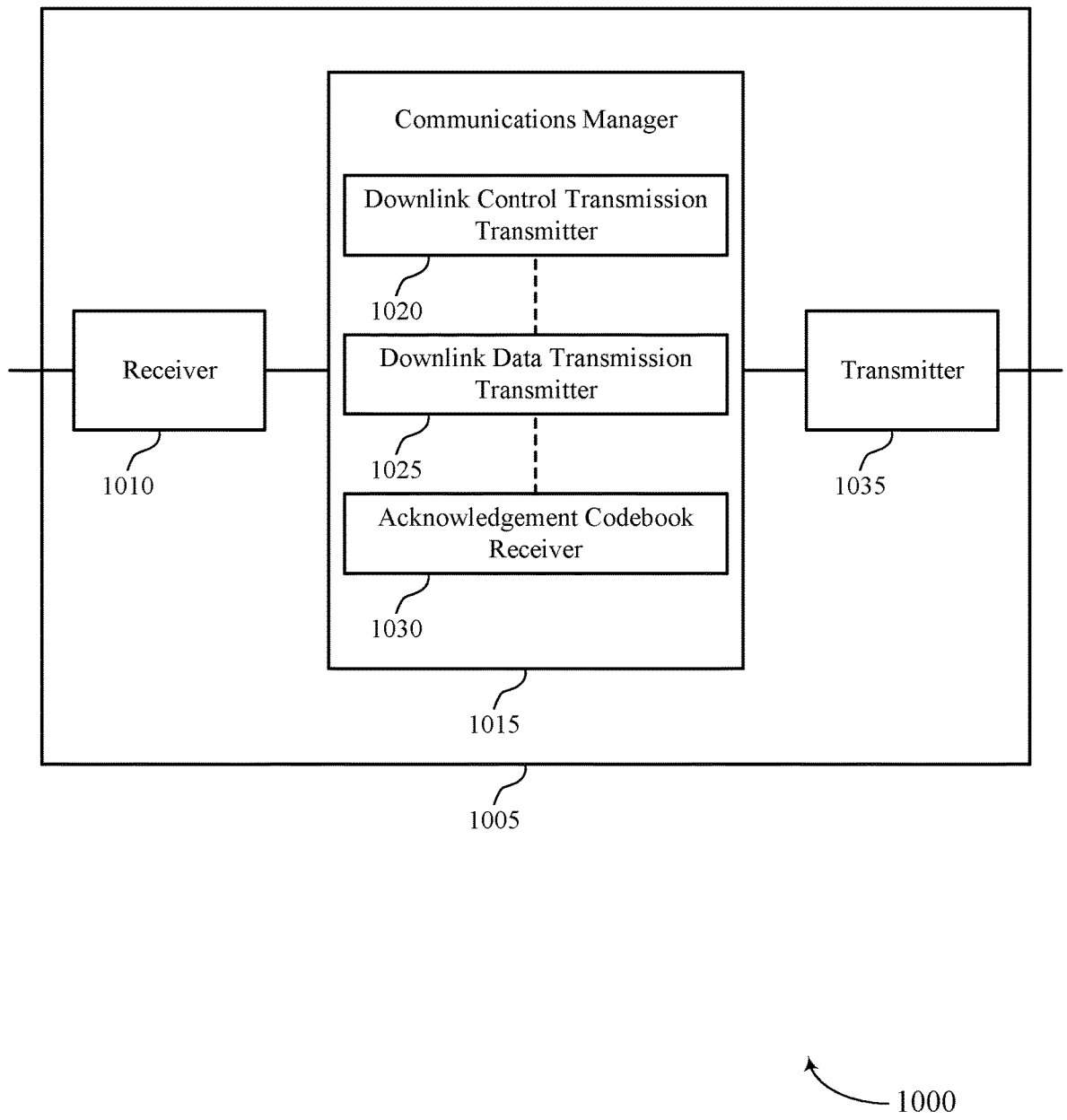

FIG. 10 shows a block diagram 1000 of a device 1005 that supports handling collisions between multiple acknowledgement transmissions and an uplink data transmission in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to handling collisions between multiple acknowledgement transmissions and an uplink data transmission, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a downlink control transmission transmitter 1020, a downlink data transmission transmitter 1025, and an acknowledgement codebook receiver 1030. The communications manager 1015 may be an example of aspects of the communications manager 1210 described herein.

The downlink control transmission transmitter 1020 may transmit, to a UE, a downlink control transmission scheduling an uplink data transmission for the UE during a slot.

The downlink data transmission transmitter 1025 may transmit, to the UE, multiple downlink data transmissions that are to be acknowledged by the UE via corresponding multiple transmission acknowledgment messages that are scheduled to at least partially overlap in time with the uplink data transmission.

The acknowledgement codebook receiver 1030 may receive, from the UE, one or more acknowledgement codebooks corresponding to the multiple transmission acknowledgement messages, where the one or more acknowledgement codebooks are multiplexed with the uplink data transmission based on a set of timing thresholds being satisfied by an earliest of the multiple transmission acknowledgement messages and the uplink data transmission with respect to a latest downlink data transmission of the multiple downlink data transmissions and the downlink control transmission scheduling the uplink data transmission.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
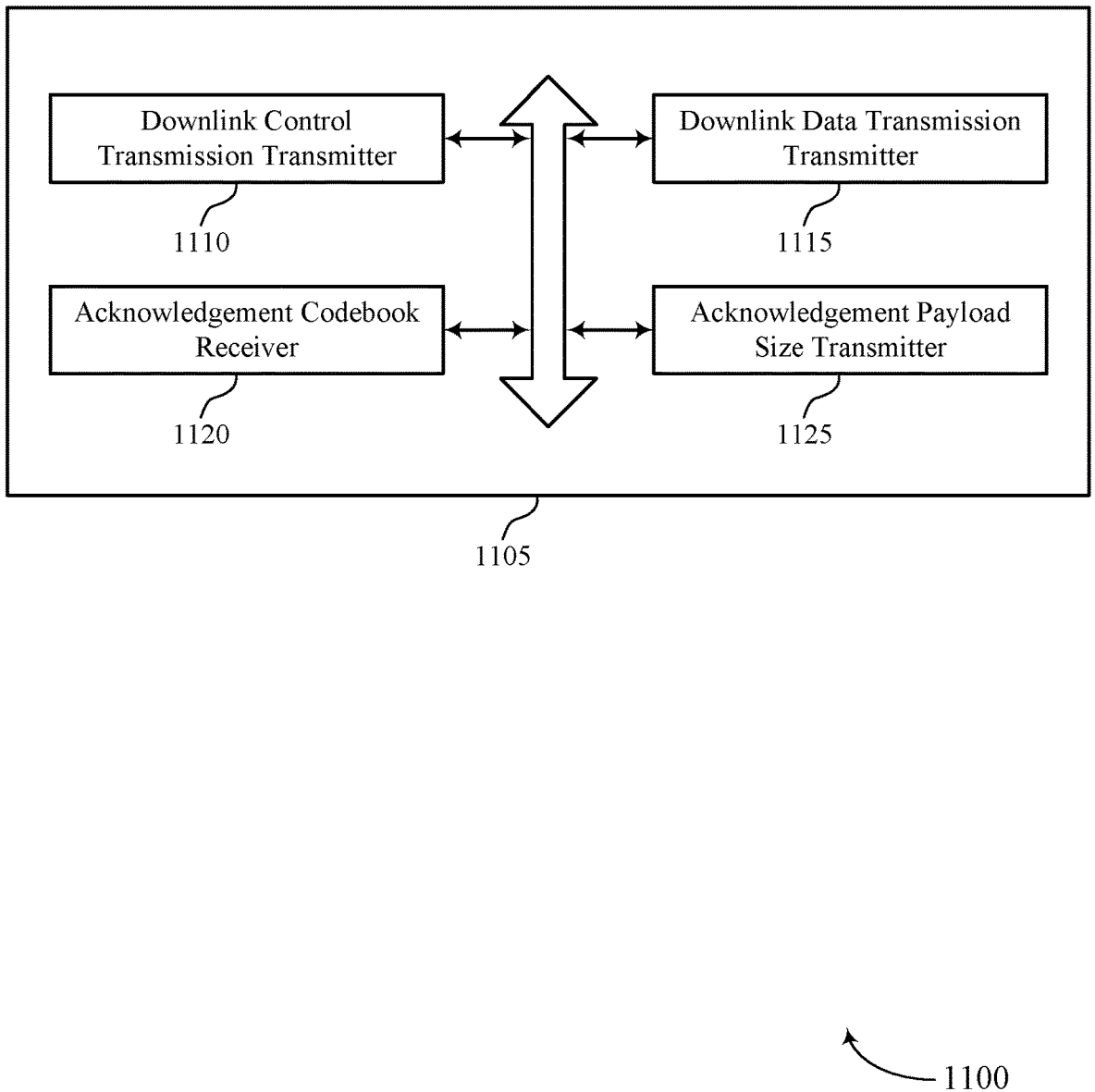
FIG. 11 shows a block diagram of a communications manager that supports handling collisions between multiple acknowledgement transmissions and an uplink data transmission in accordance with aspects of the present disclosure.

FIG. 11 shows a block diagram 1100 of a communications manager 1105 that supports handling collisions between multiple acknowledgement transmissions and an uplink data transmission in accordance with aspects of the present disclosure. The communications manager 1105 may be an example of aspects of a communications manager 915, a communications manager 1015, or a communications manager 1210 described herein. The communications manager 1105 may include a downlink control transmission transmitter 1110, a downlink data transmission transmitter 1115, an acknowledgement codebook receiver 1120, and an acknowledgement payload size transmitter 1125. Each of these modules may communicate, directly or indirectly, with one another (e.g., via one or more buses).

The downlink control transmission transmitter 1110 may transmit, to a UE, a downlink control transmission scheduling an uplink data transmission for the UE during a slot. In some examples, the downlink control transmission transmitter 1110 may transmit a downlink control information scheduling at least one of the multiple downlink data transmissions such that the downlink control information is received at the UE after the downlink control transmission scheduling the uplink data transmission, where ones of the multiple transmission acknowledgement messages that are responsive to the at least one of the multiple downlink data transmissions are not included in the one or more acknowledgement codebooks multiplexed with the uplink data transmission received from the UE.

The downlink data transmission transmitter 1115 may transmit, to the UE, multiple downlink data transmissions that are to be acknowledged by the UE via corresponding multiple transmission acknowledgment messages that are scheduled to at least partially overlap in time with the uplink data transmission. In some cases, the multiple transmission acknowledgement messages are each scheduled to be transmitted via separate physical uplink control channel transmissions within the slot. In some cases, the multiple transmission acknowledgement messages are scheduled to be transmitted on a first carrier that has a higher sub-carrier spacing than that of a second carrier used by the uplink data transmission, and where the multiple transmission acknowledgement messages are each scheduled to be transmitted via separate physical uplink control channel transmissions within corresponding slots of the first carrier. In some cases, the multiple transmission acknowledgement messages and the uplink data transmission are each associated with a same traffic type. In some cases, the same traffic type is ultra-reliable low-latency communications traffic. In some cases, the same traffic type is enhanced mobile broadband traffic.

The acknowledgement codebook receiver 1120 may receive, from the UE, one or more acknowledgement codebooks corresponding to the multiple transmission acknowledgement messages, where the one or more acknowledgement codebooks are multiplexed with the uplink data transmission based on a set of timing thresholds being satisfied by an earliest of the multiple transmission acknowledgement messages and the uplink data transmission with respect to a latest downlink data transmission of the multiple downlink data transmissions and the downlink control transmission scheduling the uplink data transmission. In some examples, the acknowledgement codebook receiver 1120 may receive one or more acknowledgement codebooks corresponding to the multiple transmission acknowledgement messages and multiplexed with the uplink data transmission is further based on downlink control information scheduling the multiple downlink data transmissions being received at the UE before the downlink control transmission scheduling the uplink data transmission. In some examples, the acknowledgement codebook receiver 1120 may receive the multiple transmission acknowledgement messages as separately encoded acknowledgement codebooks. In some examples, the acknowledgement codebook receiver 1120 may receive the multiple transmission acknowledgement messages as a jointly encoded acknowledgement codebook. In some cases, the set of timing thresholds include a first timing threshold and a second timing threshold, the first timing threshold being satisfied by the earliest of the multiple transmission acknowledgement messages and the uplink data transmission being at least a first predetermined number of symbols after a last symbol of the latest downlink data transmission of the multiple downlink data transmissions, and the second timing threshold being satisfied by the earliest of the multiple transmission acknowledgement messages and the uplink data transmission being at least a second predetermined number of symbols after a last symbol of the downlink control transmission scheduling the uplink data transmission.

The acknowledgement payload size transmitter 1125 may transmit a set of first indications of acknowledgement payload size, each of the set of first indications corresponding to one of the multiple transmission acknowledgement messages and being transmitted via respective downlink control information messages scheduling the multiple downlink data transmissions. In some examples, the acknowledgement payload size transmitter 1125 may transmit a single second indication of acknowledgement payload size via the downlink control transmission scheduling the uplink data transmission. In some cases, the single second indication is indicative of acknowledgement payload size for each of the one or more acknowledgement codebooks, and wherein each of the one or more acknowledgement codebooks is a coded acknowledgement codebook. In some cases, the single second indication is indicative of a single acknowledgement payload size for all of the one or more acknowledgement codebooks.

Figure 12:
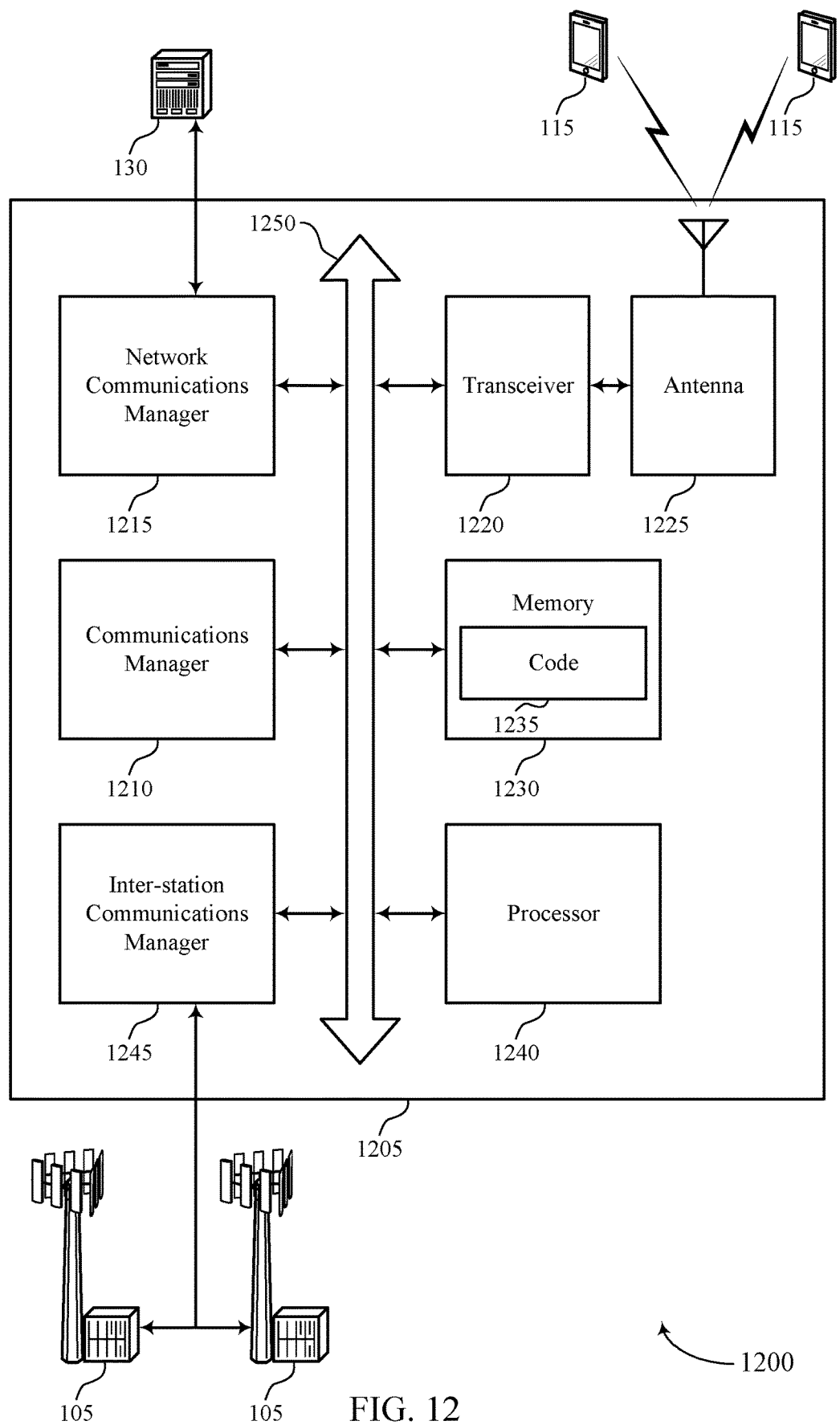
FIG. 12 shows a diagram of a system including a device that supports handling collisions between multiple acknowledgement transmissions and an uplink data transmission in accordance with aspects of the present disclosure.

FIG. 12 shows a diagram of a system 1200 including a device 1205 that supports handling collisions between multiple acknowledgement transmissions and an uplink data transmission in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit, to a UE, a downlink control transmission scheduling an uplink data transmission for the UE during a slot, transmit, to the UE, multiple downlink data transmissions that are to be acknowledged by the UE via corresponding multiple transmission acknowledgment messages that are scheduled to at least partially overlap in time with the uplink data transmission, and receive, from the UE, one or more acknowledgement codebooks corresponding to the multiple transmission acknowledgement messages, where the one or more acknowledgement codebooks are multiplexed with the uplink data transmission based on a set of timing thresholds being satisfied by an earliest of the multiple transmission acknowledgement messages and the uplink data transmission with respect to a latest downlink data transmission of the multiple downlink data transmissions and the downlink control transmission scheduling the uplink data transmission.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting handling collisions between multiple acknowledgement transmissions and an uplink data transmission).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
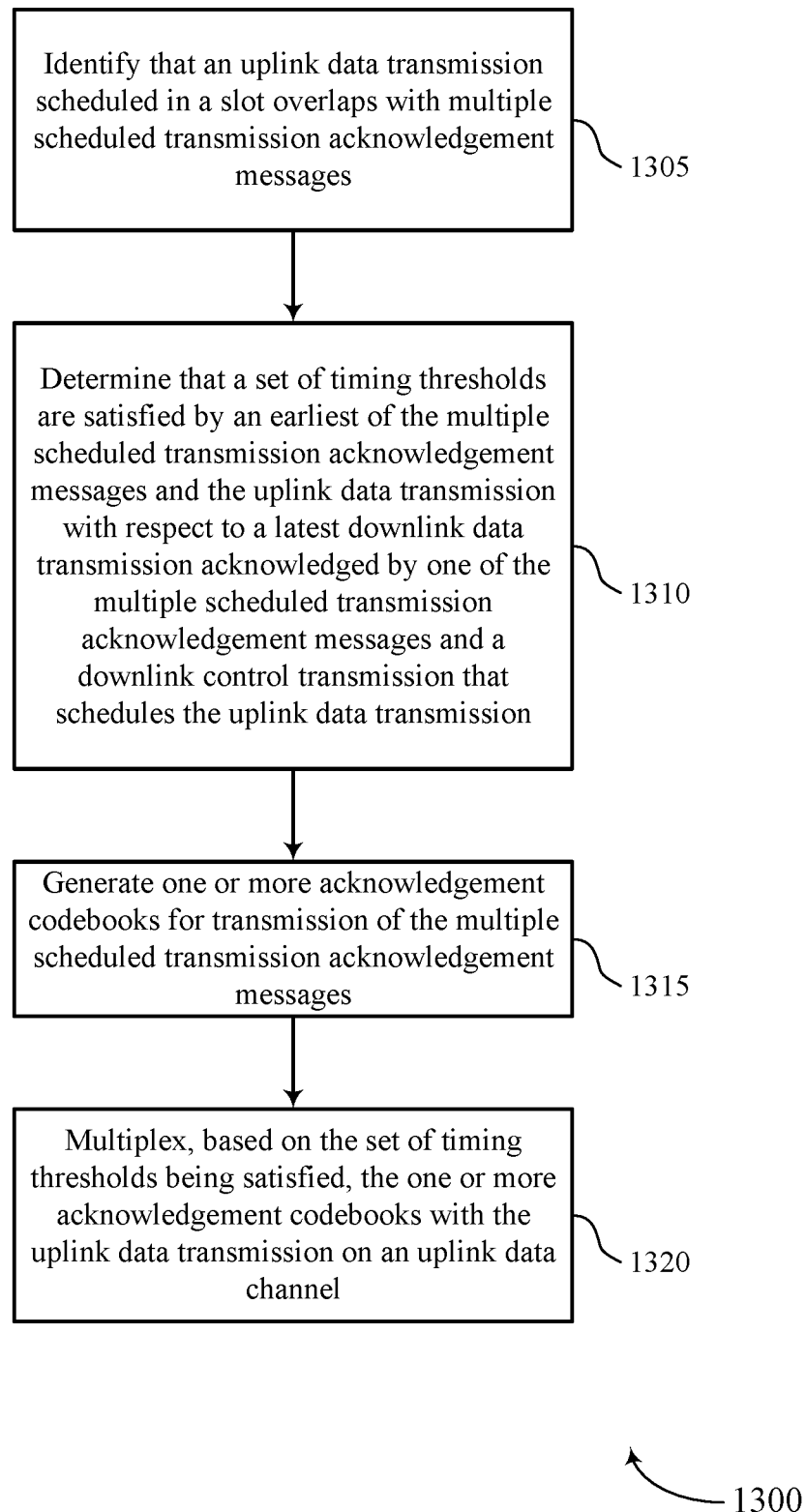
FIGS. 13 through 20 show flowcharts illustrating methods that support handling collisions between multiple acknowledgement transmissions and an uplink data transmission in accordance with aspects of the present disclosure.

FIG. 13 shows a flowchart illustrating a method 1300 that supports handling collisions between multiple acknowledgement transmissions and an uplink data transmission in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may identify that an uplink data transmission scheduled in a slot overlaps with multiple scheduled transmission acknowledgement messages. The operations of 1305 may be performed according to the methods described herein. In some examples, aspects of the operations of 1305 may be performed by an uplink data transmission identifier as described with reference to FIGS. 5 through 8.

At 1310, the UE may determine that a set of timing thresholds are satisfied by an earliest of the multiple scheduled transmission acknowledgement messages and the uplink data transmission with respect to a latest downlink data transmission acknowledged by one of the multiple scheduled transmission acknowledgement messages and a downlink control transmission that schedules the uplink data transmission. The operations of 1310 may be performed according to the methods described herein. In some examples, aspects of the operations of 1310 may be performed by a timing threshold satisfaction determiner as described with reference to FIGS. 5 through 8.

At 1315, the UE may generate one or more acknowledgement codebooks for transmission of the multiple scheduled transmission acknowledgement messages. The operations of 1315 may be performed according to the methods described herein. In some examples, aspects of the operations of 1315 may be performed by an acknowledgement codebook generator as described with reference to FIGS. 5 through 8.

At 1320, the UE may multiplex, based on the set of timing thresholds being satisfied, the one or more acknowledgement codebooks with the uplink data transmission on an uplink data channel. The operations of 1320 may be performed according to the methods described herein. In some examples, aspects of the operations of 1320 may be performed by an acknowledgement codebook multiplexer as described with reference to FIGS. 5 through 8.

Figure 14:
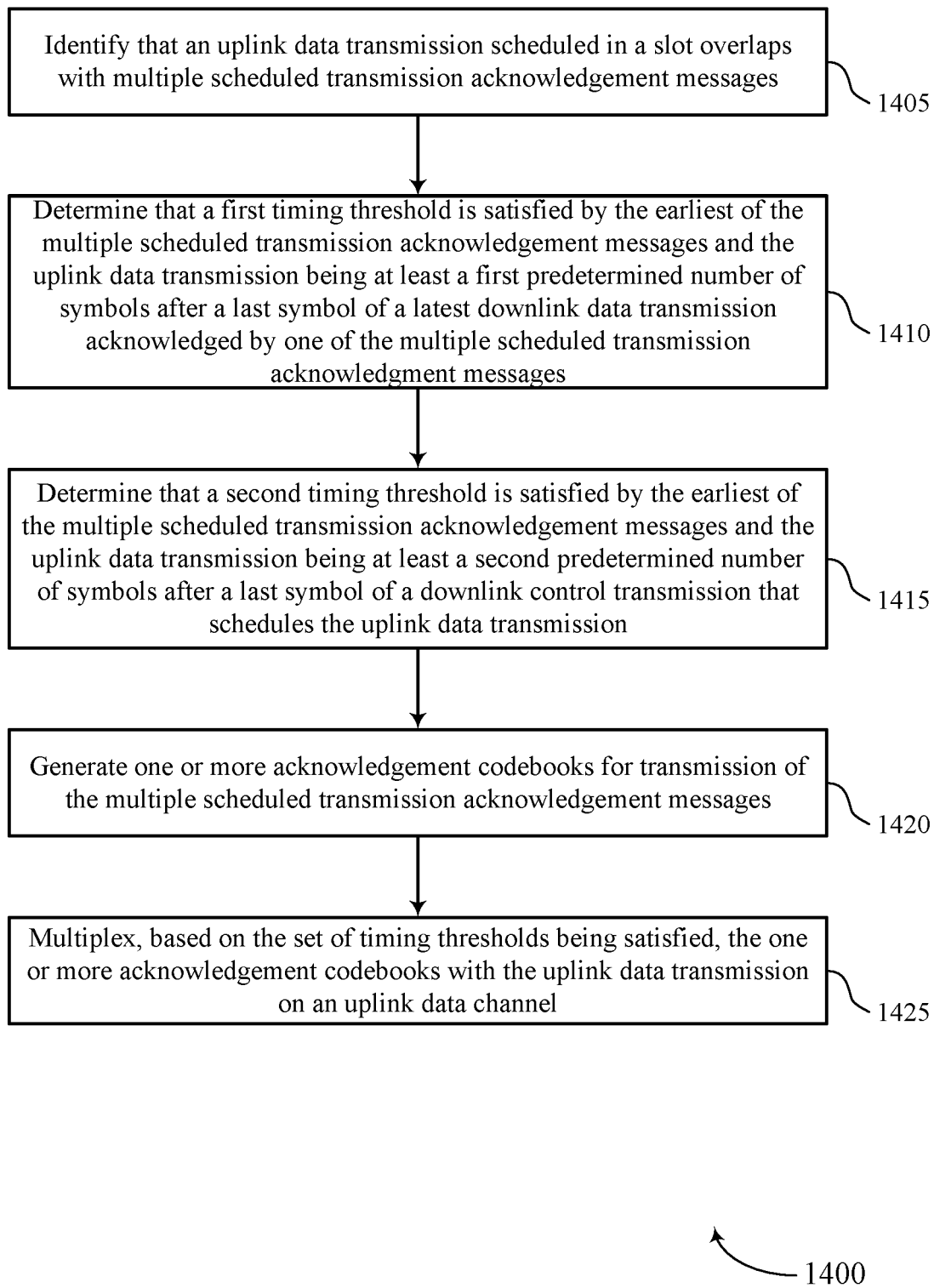

FIG. 14 shows a flowchart illustrating a method 1400 that supports handling collisions between multiple acknowledgement transmissions and an uplink data transmission in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may identify that an uplink data transmission scheduled in a slot overlaps with multiple scheduled transmission acknowledgement messages. The operations of 1405 may be performed according to the methods described herein. In some examples, aspects of the operations of 1405 may be performed by an uplink data transmission identifier as described with reference to FIGS. 5 through 8.

At 1410, the UE may determine that a first timing threshold is satisfied by the earliest of the multiple scheduled transmission acknowledgement messages and the uplink data transmission being at least a first predetermined number of symbols after a last symbol of a latest downlink data transmission acknowledged by one of the multiple scheduled transmission acknowledgment messages. The operations of 1410 may be performed according to the methods described herein. In some examples, aspects of the operations of 1410 may be performed by a timing threshold satisfaction determiner as described with reference to FIGS. 5 through 8.

At 1415, the UE may determine that a second timing threshold is satisfied by the earliest of the multiple scheduled transmission acknowledgement messages and the uplink data transmission being at least a second predetermined number of symbols after a last symbol of a downlink control transmission that schedules the uplink data transmission. The operations of 1415 may be performed according to the methods described herein. In some examples, aspects of the operations of 1415 may be performed by a timing threshold satisfaction determiner as described with reference to FIGS. 5 through 8.

At 1420, the UE may generate one or more acknowledgement codebooks for transmission of the multiple scheduled transmission acknowledgement messages. The operations of 1420 may be performed according to the methods described herein. In some examples, aspects of the operations of 1420 may be performed by an acknowledgement codebook generator as described with reference to FIGS. 5 through 8.

At 1425, the UE may multiplex, based on the set of timing thresholds being satisfied, the one or more acknowledgement codebooks with the uplink data transmission on an uplink data channel. The operations of 1425 may be performed according to the methods described herein. In some examples, aspects of the operations of 1425 may be performed by an acknowledgement codebook multiplexer as described with reference to FIGS. 5 through 8.

Figure 15:
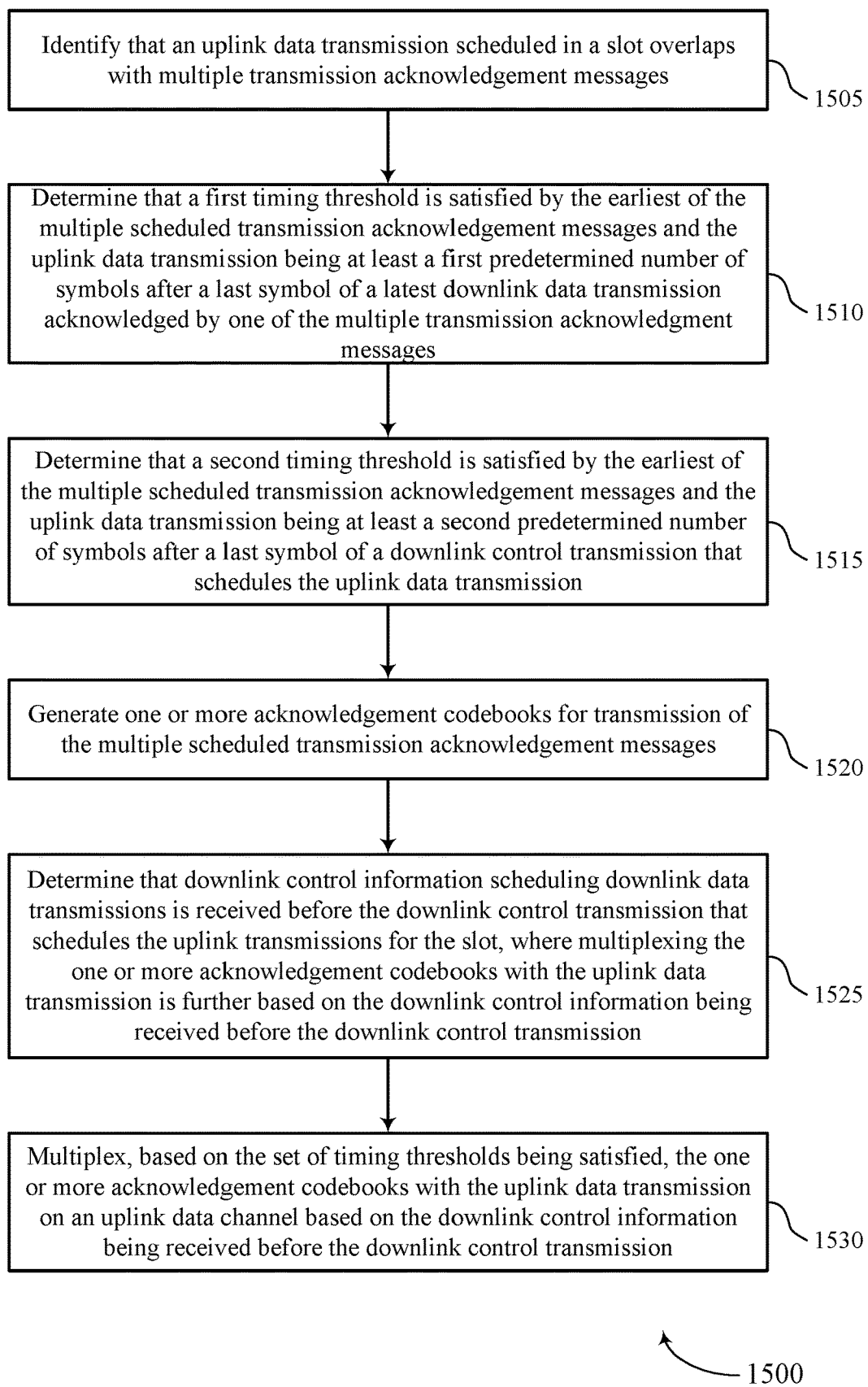

FIG. 15 shows a flowchart illustrating a method 1500 that supports handling collisions between multiple acknowledgement transmissions and an uplink data transmission in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may identify that an uplink data transmission scheduled in a slot overlaps with multiple transmission acknowledgement messages. The operations of 1505 may be performed according to the methods described herein. In some examples, aspects of the operations of 1505 may be performed by an uplink data transmission identifier as described with reference to FIGS. 5 through 8.

At 1510, the UE may determine that a first timing threshold is satisfied by the earliest of the multiple scheduled transmission acknowledgement messages and the uplink data transmission being at least a first predetermined number of symbols after a last symbol of a latest downlink data transmission acknowledged by one of the multiple transmission acknowledgment messages. The operations of 1510 may be performed according to the methods described herein. In some examples, aspects of the operations of 1510 may be performed by a timing threshold satisfaction determiner as described with reference to FIGS. 5 through 8.

At 1515, the UE may determine that a second timing threshold is satisfied by the earliest of the multiple scheduled transmission acknowledgement messages and the uplink data transmission being at least a second predetermined number of symbols after a last symbol of a downlink control transmission that schedules the uplink data transmission. The operations of 1515 may be performed according to the methods described herein. In some examples, aspects of the operations of 1515 may be performed by a timing threshold satisfaction determiner as described with reference to FIGS. 5 through 8.

At 1520, the UE may generate one or more acknowledgement codebooks for transmission of the multiple scheduled transmission acknowledgement messages. The operations of 1520 may be performed according to the methods described herein. In some examples, aspects of the operations of 1520 may be performed by an acknowledgement codebook generator as described with reference to FIGS. 5 through 8.

At 1525, the UE may determine that downlink control information scheduling downlink data transmissions is received before the downlink control transmission that schedules the uplink transmissions for the slot. The operations of 1525 may be performed according to the methods described herein. In some examples, aspects of the operations of 1525 may be performed by an acknowledgement codebook multiplexer as described with reference to FIGS. 5 through 8.

At 1530, the UE may multiplex, based on the set of timing thresholds being satisfied, the one or more acknowledgement codebooks with the uplink data transmission on an uplink data channel based on the downlink control information being received before the downlink control transmission. The operations of 1530 may be performed according to the methods described herein. In some examples, aspects of the operations of 1530 may be performed by an acknowledgement codebook multiplexer as described with reference to FIGS. 5 through 8.

Figure 16:
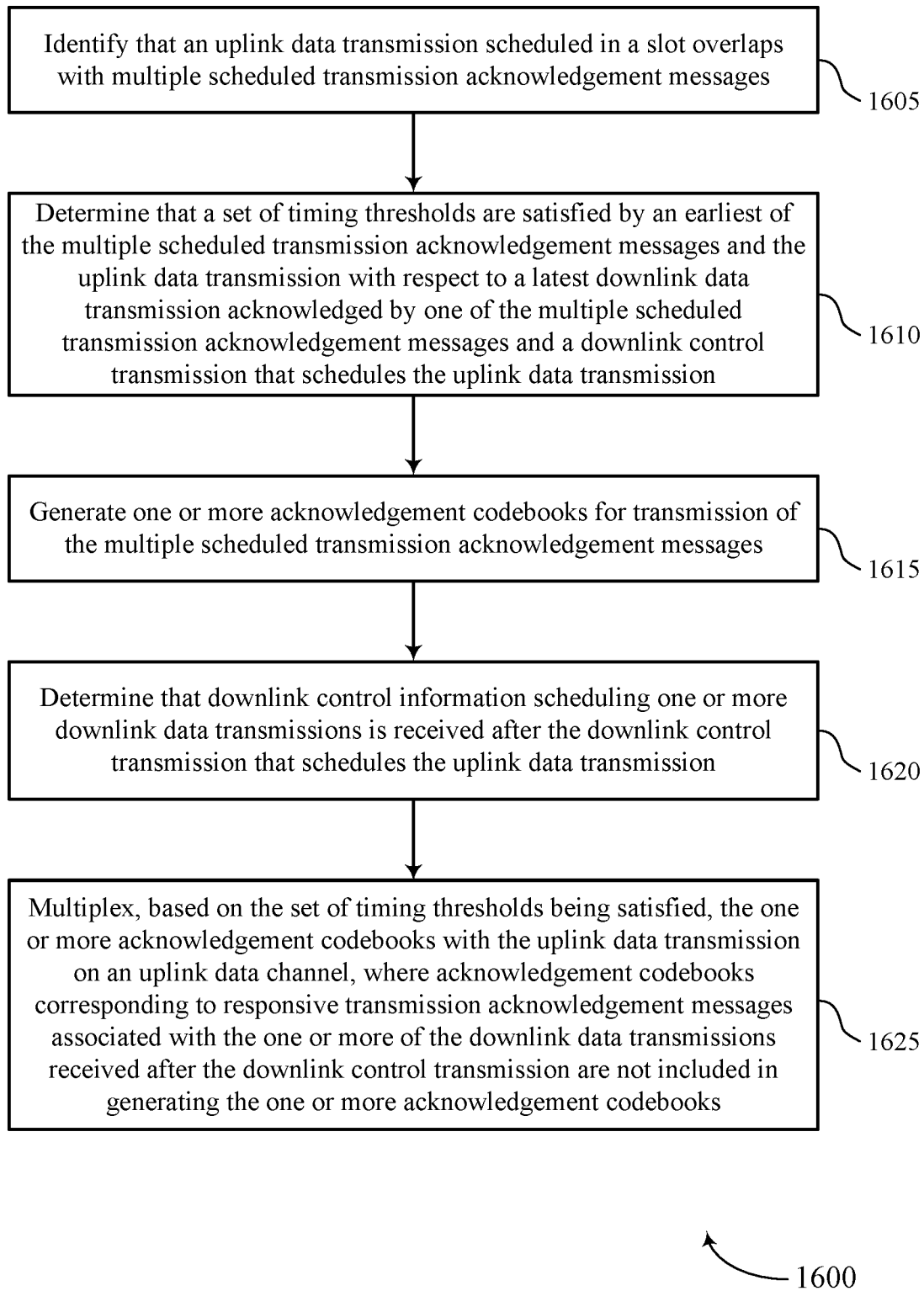

FIG. 16 shows a flowchart illustrating a method 1600 that supports handling collisions between multiple acknowledgement transmissions and an uplink data transmission in accordance with aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may identify that an uplink data transmission scheduled in a slot overlaps with multiple scheduled transmission acknowledgement messages. The operations of 1605 may be performed according to the methods described herein. In some examples, aspects of the operations of 1605 may be performed by an uplink data transmission identifier as described with reference to FIGS. 5 through 8.

At 1610, the UE may determine that a set of timing thresholds are satisfied by an earliest of the multiple scheduled transmission acknowledgement messages and the uplink data transmission with respect to a latest downlink data transmission acknowledged by one of the multiple scheduled transmission acknowledgement messages and a downlink control transmission that schedules the uplink data transmission. The operations of 1610 may be performed according to the methods described herein. In some examples, aspects of the operations of 1610 may be performed by a timing threshold satisfaction determiner as described with reference to FIGS. 5 through 8.

At 1615, the UE may generate one or more acknowledgement codebooks for transmission of the multiple scheduled transmission acknowledgement messages. The operations of 1615 may be performed according to the methods described herein. In some examples, aspects of the operations of 1615 may be performed by an acknowledgement codebook generator as described with reference to FIGS. 5 through 8.

At 1620, the UE may determine that downlink control information scheduling one or more downlink data transmissions is received after the downlink control transmission that schedules the uplink data transmission. The operations of 1620 may be performed according to the methods described herein. In some examples, aspects of the operations of 1620 may be performed by an acknowledgement codebook multiplexer as described with reference to FIGS. 5 through 8.

At 1625, the UE may multiplex, based on the set of timing thresholds being satisfied, the one or more acknowledgement codebooks with the uplink data transmission on an uplink data channel, where acknowledgement codebooks corresponding to responsive transmission acknowledgement messages associated with the one or more of the downlink data transmissions received after the downlink control transmission are not included in generating the one or more acknowledgement codebooks. The operations of 1625 may be performed according to the methods described herein. In some examples, aspects of the operations of 1625 may be performed by an acknowledgement codebook multiplexer as described with reference to FIGS. 5 through 8.

Figure 17:
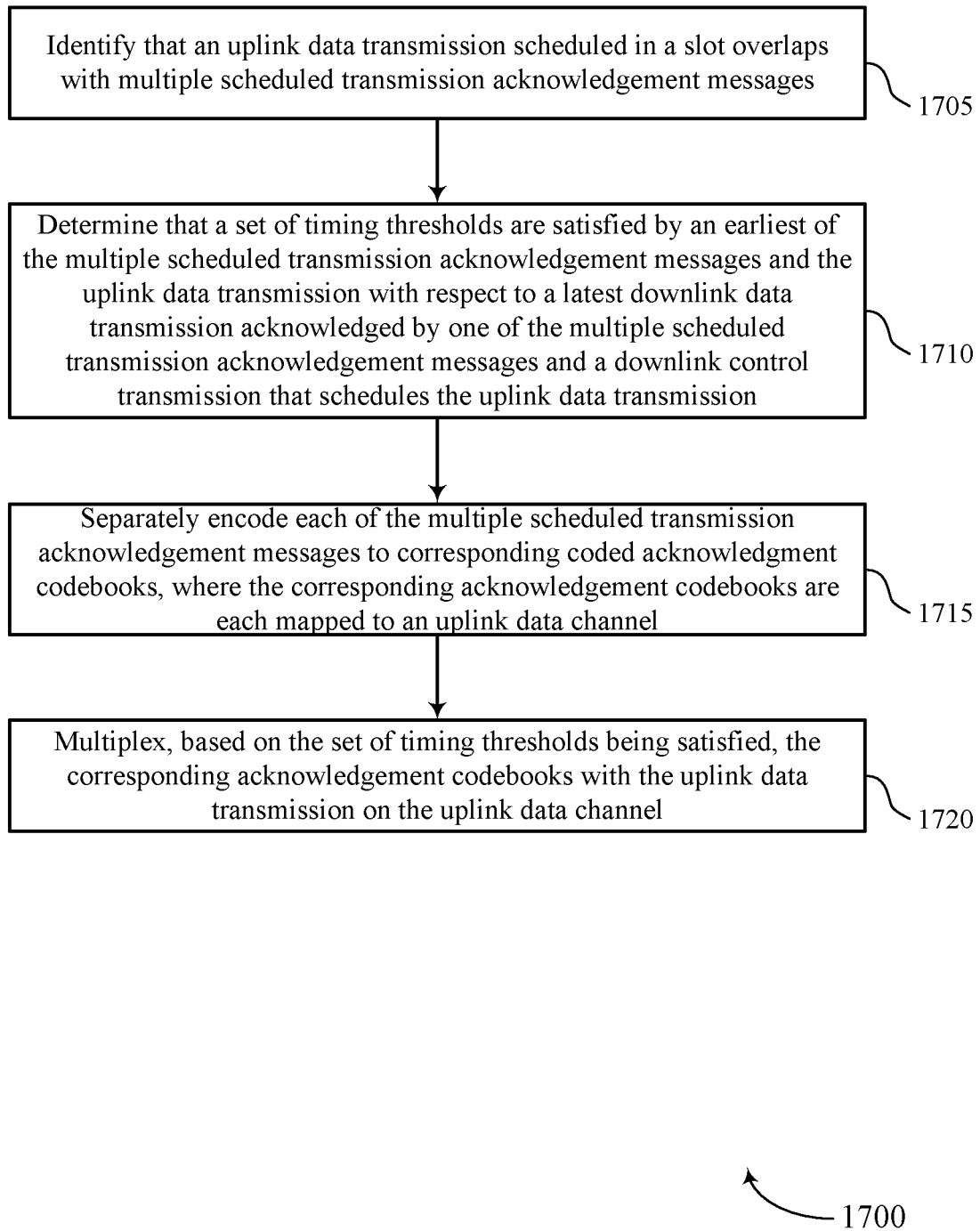

FIG. 17 shows a flowchart illustrating a method 1700 that supports handling collisions between multiple acknowledgement transmissions and an uplink data transmission in accordance with aspects of the present disclosure. The operations of method 1700 may be implemented by a UE 115 or its components as described herein. For example, the operations of method 1700 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1705, the UE may identify that an uplink data transmission scheduled in a slot overlaps with multiple scheduled transmission acknowledgement messages. The operations of 1705 may be performed according to the methods described herein. In some examples, aspects of the operations of 1705 may be performed by an uplink data transmission identifier as described with reference to FIGS. 5 through 8.

At 1710, the UE may determine that a set of timing thresholds are satisfied by an earliest of the multiple scheduled transmission acknowledgement messages and the uplink data transmission with respect to a latest downlink data transmission acknowledged by one of the multiple scheduled transmission acknowledgement messages and a downlink control transmission that schedules the uplink data transmission. The operations of 1710 may be performed according to the methods described herein. In some examples, aspects of the operations of 1710 may be performed by a timing threshold satisfaction determiner as described with reference to FIGS. 5 through 8.

At 1715, the UE may separately encode each of the multiple scheduled transmission acknowledgement messages to corresponding coded acknowledgment codebooks, where the corresponding acknowledgement codebooks are each mapped to an uplink data channel. The operations of 1715 may be performed according to the methods described herein. In some examples, aspects of the operations of 1715 may be performed by a transmission acknowledgement message encoder as described with reference to FIGS. 5 through 8.

At 1720, the UE may multiplex, based on the set of timing thresholds being satisfied, the corresponding acknowledgement codebooks with the uplink data transmission on the uplink data channel. The operations of 1720 may be performed according to the methods described herein. In some examples, aspects of the operations of 1720 may be performed by an acknowledgement codebook multiplexer as described with reference to FIGS. 5 through 8.

Figure 18:
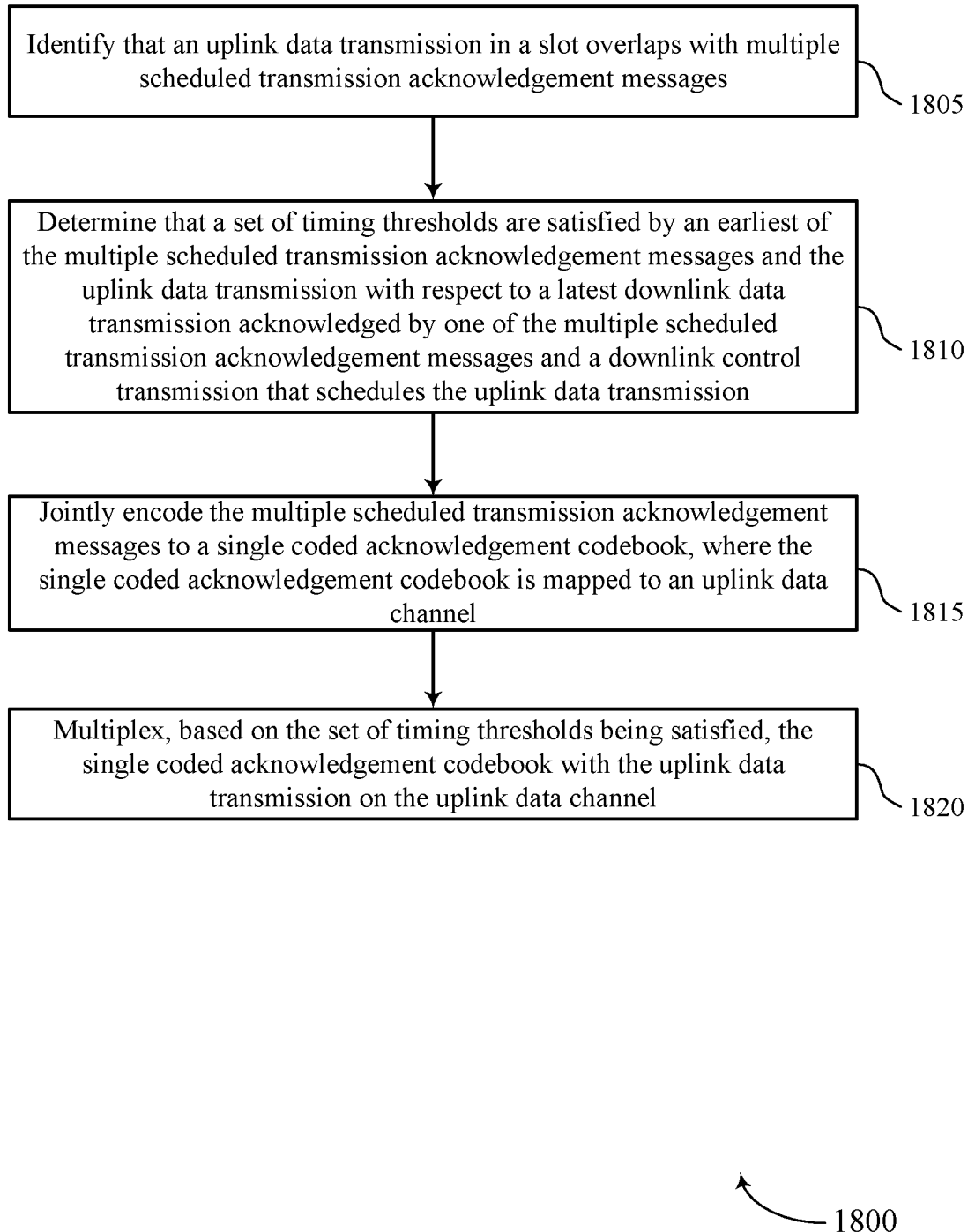

FIG. 18 shows a flowchart illustrating a method 1800 that supports handling collisions between multiple acknowledgement transmissions and an uplink data transmission in accordance with aspects of the present disclosure. The operations of method 1800 may be implemented by a UE 115 or its components as described herein. For example, the operations of method 1800 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1805, the UE may identify that an uplink data transmission in a slot overlaps with multiple scheduled transmission acknowledgement messages. The operations of 1805 may be performed according to the methods described herein. In some examples, aspects of the operations of 1805 may be performed by an uplink data transmission identifier as described with reference to FIGS. 5 through 8.

At 1810, the UE may determine that a set of timing thresholds are satisfied by an earliest of the multiple scheduled transmission acknowledgement messages and the uplink data transmission with respect to a latest downlink data transmission acknowledged by one of the multiple scheduled transmission acknowledgement messages and a downlink control transmission that schedules the uplink data transmission. The operations of 1810 may be performed according to the methods described herein. In some examples, aspects of the operations of 1810 may be performed by a timing threshold satisfaction determiner as described with reference to FIGS. 5 through 8.

At 1815, the UE may jointly encode the multiple scheduled transmission acknowledgement messages to a single coded acknowledgement codebook, where the single coded acknowledgement codebook is mapped to an uplink data channel. The operations of 1815 may be performed according to the methods described herein. In some examples, aspects of the operations of 1815 may be performed by a transmission acknowledgement message encoder as described with reference to FIGS. 5 through 8.

At 1820, the UE may multiplex, based on the set of timing thresholds being satisfied, the single coded acknowledgement codebook with the uplink data transmission on the uplink data channel. The operations of 1820 may be performed according to the methods described herein. In some examples, aspects of the operations of 1820 may be performed by an acknowledgement codebook multiplexer as described with reference to FIGS. 5 through 8.

Figure 19:
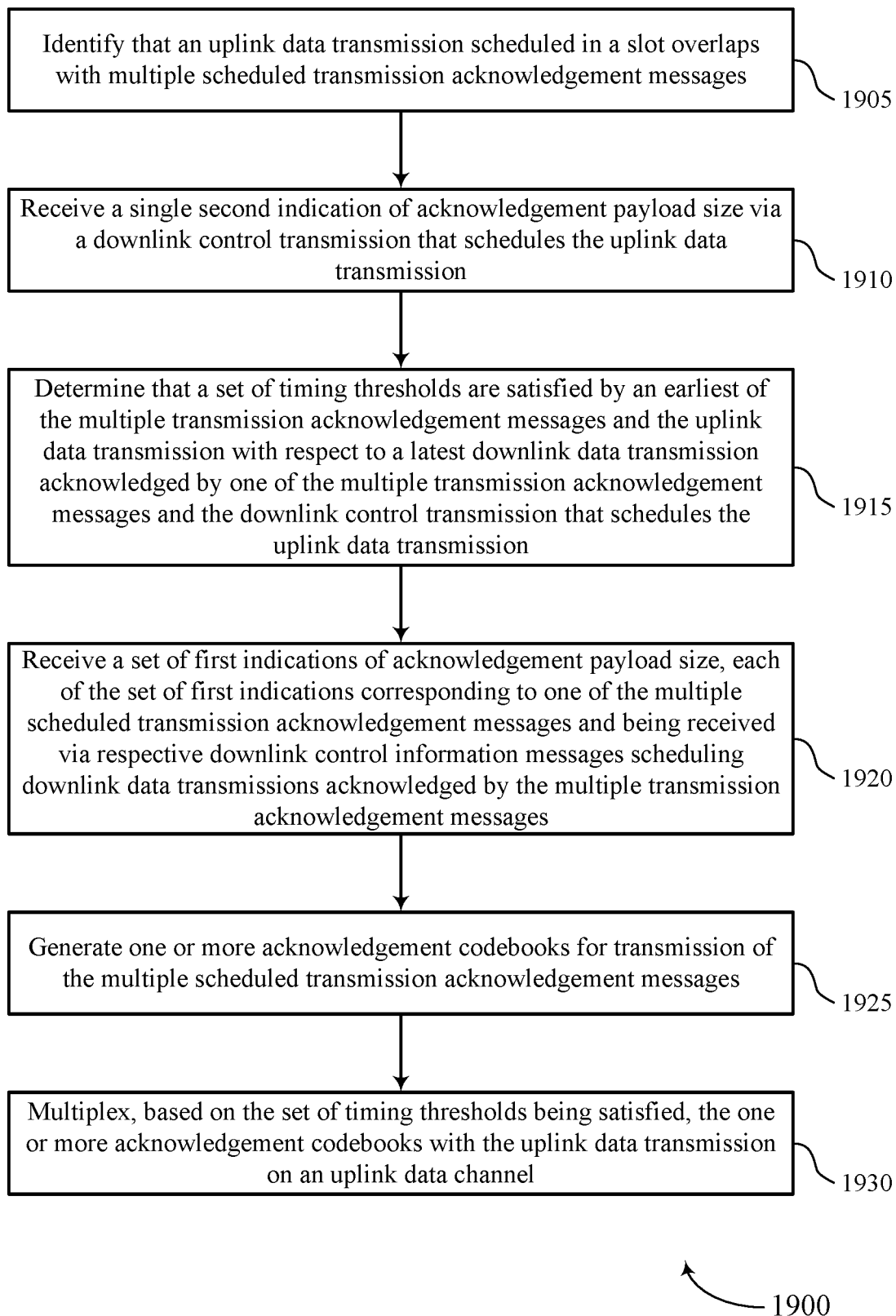

FIG. 19 shows a flowchart illustrating a method 1900 that supports handling collisions between multiple acknowledgement transmissions and an uplink data transmission in accordance with aspects of the present disclosure. The operations of method 1900 may be implemented by a UE 115 or its components as described herein. For example, the operations of method 1900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1905, the UE may identify that an uplink data transmission scheduled in a slot overlaps with multiple scheduled transmission acknowledgement messages. The operations of 1905 may be performed according to the methods described herein. In some examples, aspects of the operations of 1905 may be performed by an uplink data transmission identifier as described with reference to FIGS. 5 through 8.

At 1910, the UE may receive a single second indication of acknowledgement payload size via a downlink control transmission that schedules the uplink data transmission. The operations of 1910 may be performed according to the methods described herein. In some examples, aspects of the operations of 1910 may be performed by an acknowledgement payload size indicator as described with reference to FIGS. 5 through 8.

At 1915, the UE may determine that a set of timing thresholds are satisfied by an earliest of the multiple transmission acknowledgement messages and the uplink data transmission with respect to a latest downlink data transmission acknowledged by one of the multiple transmission acknowledgement messages and the downlink control transmission that schedules the uplink data transmission. The operations of 1915 may be performed according to the methods described herein. In some examples, aspects of the operations of 1915 may be performed by a timing threshold satisfaction determiner as described with reference to FIGS. 5 through 8.

At 1920, the UE may receive a set of first indications of acknowledgement payload size, each of the set of first indications corresponding to one of the multiple scheduled transmission acknowledgement messages and being received via respective downlink control information messages scheduling downlink data transmissions acknowledged by the multiple transmission acknowledgement messages. The operations of 1920 may be performed according to the methods described herein. In some examples, aspects of the operations of 1920 may be performed by an acknowledgement payload size indicator as described with reference to FIGS. 5 through 8.

At 1925, the UE may generate one or more acknowledgement codebooks for transmission of the multiple scheduled transmission acknowledgement messages. The operations of 1925 may be performed according to the methods described herein. In some examples, aspects of the operations of 1925 may be performed by an acknowledgement codebook generator as described with reference to FIGS. 5 through 8.

At 1930, the UE may multiplex, based on the set of timing thresholds being satisfied, the one or more acknowledgement codebooks with the uplink data transmission on an uplink data channel. The operations of 1930 may be performed according to the methods described herein. In some examples, aspects of the operations of 1930 may be performed by an acknowledgement codebook multiplexer as described with reference to FIGS. 5 through 8.

Figure 20:
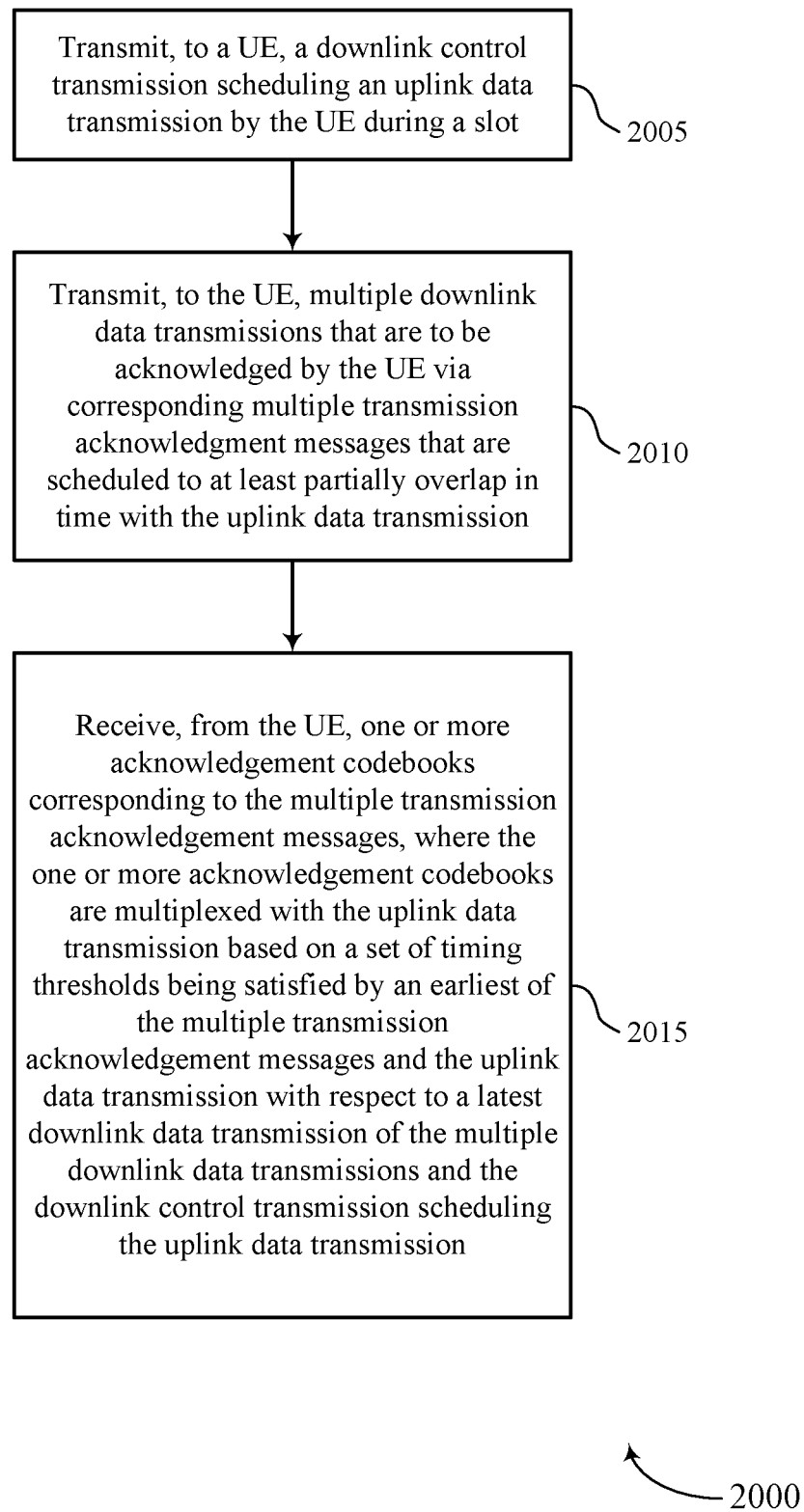

FIG. 20 shows a flowchart illustrating a method 2000 that supports handling collisions between multiple acknowledgement transmissions and an uplink data transmission in accordance with aspects of the present disclosure. The operations of method 2000 may be implemented by a base station 105 or its components as described herein. For example, the operations of method 2000 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 2005, the base station may transmit, to a UE, a downlink control transmission scheduling an uplink data transmission by the UE during a slot. The operations of 2005 may be performed according to the methods described herein. In some examples, aspects of the operations of 2005 may be performed by a downlink control transmission transmitter as described with reference to FIGS. 9 through 12.

At 2010, the base station may transmit, to the UE, multiple downlink data transmissions that are to be acknowledged by the UE via corresponding multiple transmission acknowledgment messages that are scheduled to at least partially overlap in time with the uplink data transmission. The operations of 2010 may be performed according to the methods described herein. In some examples, aspects of the operations of 2010 may be performed by a downlink data transmission transmitter as described with reference to FIGS. 9 through 12.

At 2015, the base station may receive, from the UE, one or more acknowledgement codebooks corresponding to the multiple transmission acknowledgement messages, where the one or more acknowledgement codebooks are multiplexed with the uplink data transmission based on a set of timing thresholds being satisfied by an earliest of the multiple transmission acknowledgement messages and the uplink data transmission with respect to a latest downlink data transmission of the multiple downlink data transmissions and the downlink control transmission scheduling the uplink data transmission. The operations of 2015 may be performed according to the methods described herein. In some examples, aspects of the operations of 2015 may be performed by an acknowledgement codebook receiver as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

Aspects of the following examples may be combined with any of the previous examples or aspects described herein.

Example 1

A method for wireless communication at a UE, comprising: identifying that an uplink data transmission scheduled in a slot overlaps with multiple scheduled transmission acknowledgement messages; determining that a plurality of timing thresholds are satisfied by an earliest of the multiple scheduled transmission acknowledgement messages and the uplink data transmission with respect to a latest downlink data transmission acknowledged by one of the multiple scheduled transmission acknowledgement messages and a downlink control transmission that schedules the uplink data transmission; generating one or more acknowledgement codebooks for transmission of the multiple scheduled transmission acknowledgement messages; and multiplexing, based at least in part on the plurality of timing thresholds being satisfied, the one or more acknowledgement codebooks with the uplink data transmission on an uplink data channel.

Example 2

The method of example 1, wherein determining that the plurality of timing thresholds are satisfied comprises: determining that a first timing threshold is satisfied by the earliest of the multiple scheduled transmission acknowledgement messages and the uplink data transmission being at least a first predetermined number of symbols after a last symbol of the latest downlink data transmission acknowledged by one of the multiple transmission acknowledgment messages; and determining that a second timing threshold is satisfied by the earliest of the multiple scheduled transmission acknowledgement messages and the uplink data transmission being at least a second predetermined number of symbols after a last symbol of the downlink control transmission that schedules the uplink data transmission.

Example 3

The method of any of examples 1 or 2, further comprising: determining that downlink control information scheduling downlink data transmissions is received before the downlink control transmission that schedules the uplink data transmission, wherein multiplexing the one or more acknowledgement codebooks with the uplink data transmission is further based on the downlink control information being received before the downlink control transmission.

Example 4

The method of any of examples 1 to 3, further comprising: determining that downlink control information scheduling one or more downlink data transmissions is received after the downlink control transmission that schedules the uplink data transmission, wherein acknowledgement codebooks corresponding to responsive transmission acknowledgement messages associated with the one or more downlink data transmissions received after the downlink control transmission are not included in generating the one or more acknowledgement codebooks.

Example 5

The method of any of examples 1 to 4, wherein generating the one or more acknowledgement codebooks for transmission of the multiple scheduled transmission acknowledgement messages comprises: separately encoding each of the multiple scheduled transmission acknowledgement messages to corresponding coded acknowledgment codebooks, wherein the corresponding acknowledgement codebooks are each mapped to the uplink data channel.

Example 6

The method of any of examples 1 to 5, wherein generating the one or more acknowledgement codebooks for transmission of the multiple scheduled transmission acknowledgement messages comprises: jointly encoding the multiple scheduled transmission acknowledgement messages to a single coded acknowledgement codebook, wherein the single coded acknowledgement codebook is mapped to the uplink data channel.

Example 7

The method of any of examples 1 to 6, further comprising: receiving a plurality of first indications of acknowledgement payload size, each of the plurality of first indications corresponding to one of the multiple scheduled transmission acknowledgement messages and being received via respective downlink control information messages scheduling downlink data transmissions acknowledged by the multiple scheduled transmission acknowledgement messages; and receiving a single second indication of acknowledgement payload size via the downlink control transmission that schedules the uplink data transmission.

Example 8

The method of any of examples 1 to 7, wherein generating the one or more acknowledgement codebooks for transmission of the multiple scheduled transmission acknowledgement messages comprises: generating a separate acknowledgement codebook for each of the multiple scheduled transmission acknowledgement messages based on respective ones of the plurality of first indications; and padding one or more of the separate acknowledgement codebooks according to the single second indication to generate a plurality of updated acknowledgement codebooks for multiplexing the one or more acknowledgement codebooks with the uplink data transmission.

Example 9

The method of any of examples 1 to 8, further comprising: concatenating each of the plurality of updated acknowledgement codebooks prior to multiplexing the one or more acknowledgement codebooks with the uplink data transmission.

Example 10

The method of any of examples 1 to 9, wherein generating the one or more acknowledgement codebooks for transmission of the multiple scheduled transmission acknowledgement messages comprises: generating a separate acknowledgement codebook for each of the multiple scheduled transmission acknowledgement messages based on respective ones of the plurality of first indications; concatenating the separate acknowledgement codebooks for each of the multiple scheduled transmission acknowledgement messages; and applying the single second indication to the concatenated acknowledgement codebooks to generate a single updated acknowledgement codebook for multiplexing the one or more acknowledgement codebooks with the uplink data transmission.

Example 11

The method of any of examples 1 to 10, wherein the multiple scheduled transmission acknowledgement messages are each scheduled to be transmitted via separate physical uplink control channel transmissions within the slot.

Example 12

The method of any of examples 1 to 11, wherein the multiple scheduled transmission acknowledgement messages are scheduled to be transmitted on a first carrier that has a higher sub-carrier spacing than that of a second carrier used by the uplink data transmission, and wherein the multiple scheduled transmission acknowledgement messages are each scheduled to be transmitted via separate physical uplink control channel transmissions within corresponding slots of the first carrier.

Example 13

The method of any of examples 1 to 12, wherein the multiple scheduled transmission acknowledgement messages and the uplink data transmission are each associated with a same traffic type.

Example 14

The method of any of examples 1 to 13, wherein the same traffic type is ultra-reliable low-latency communications traffic.

Example 15

The method of any of examples 1 to 14, wherein the same traffic type is enhanced mobile broadband traffic.

Example 16

An apparatus comprising at least one means for performing a method of any of examples 1 to 15.

Example 17

An apparatus for wireless communications comprising a processor; memory coupled with the processor; and instructions stored in the memory and executable by the processor to cause the apparatus to perform a method of any of examples 1 to 15.

Example 18

A non-transitory computer-readable medium storing code for wireless communications, the code comprising instructions executable by a processor to perform a method of any of examples 1 to 15.

Example 19

A method for wireless communication at a base station, comprising: transmitting, to a user equipment (UE), a downlink control transmission scheduling an uplink data transmission for the UE during a slot; transmitting, to the UE, multiple downlink data transmissions that are to be acknowledged by the UE via corresponding multiple transmission acknowledgment messages that are scheduled to at least partially overlap in time with the uplink data transmission; and receiving, from the UE, one or more acknowledgement codebooks corresponding to the multiple transmission acknowledgement messages, wherein the one or more acknowledgement codebooks are multiplexed with the uplink data transmission based at least in part on a plurality of timing thresholds being satisfied by an earliest of the multiple transmission acknowledgement messages and the uplink data transmission with respect to a latest downlink data transmission of the multiple downlink data transmissions and the downlink control transmission scheduling the uplink data transmission.

Example 20

The method of example 19, wherein the plurality of timing thresholds comprise a first timing threshold and a second timing threshold, the first timing threshold being satisfied by the earliest of the multiple transmission acknowledgement messages and the uplink data transmission being at least a first predetermined number of symbols after a last symbol of the latest downlink data transmission of the multiple downlink data transmissions, and the second timing threshold being satisfied by the earliest of the multiple transmission acknowledgement messages and the uplink data transmission being at least a second predetermined number of symbols after a last symbol of the downlink control transmission scheduling the uplink data transmission.

Example 21

The method of any of examples 19 or 20, wherein receiving one or more acknowledgement codebooks corresponding to the multiple transmission acknowledgement messages and multiplexed with the uplink data transmission is further based on downlink control information scheduling the multiple downlink data transmissions being received at the UE before the downlink control transmission scheduling the uplink data transmission.

Example 22

The method of any of examples 19 to 21, further comprising: transmitting a downlink control information scheduling at least one of the multiple downlink data transmissions such that the downlink control information is received at the UE after the downlink control transmission scheduling the uplink data transmission, wherein ones of the multiple transmission acknowledgement messages that are responsive to the at least one of the multiple downlink data transmissions are not included in the one or more acknowledgement codebooks multiplexed with the uplink data transmission received from the UE.

Example 23

The method of any of examples 19 to 22, wherein receiving one or more acknowledgement codebooks corresponding to the multiple transmission acknowledgement messages and multiplexed with the uplink data transmission comprises: receiving the multiple transmission acknowledgement messages as separately encoded acknowledgement codebooks.

Example 24

The method of any of examples 19 to 23, wherein receiving one or more acknowledgement codebooks corresponding to the multiple transmission acknowledgement messages and multiplexed with the uplink data transmission comprises: receiving the multiple transmission acknowledgement messages as a jointly encoded acknowledgement codebook.

Example 25

The method of any of examples 19 to 24, further comprising: transmitting a plurality of first indications of acknowledgement payload size, each of the plurality of first indications corresponding to one of the multiple transmission acknowledgement messages and being transmitted via respective downlink control information messages scheduling the multiple downlink data transmissions; and transmitting a single second indication of acknowledgement payload size via the downlink control transmission scheduling the uplink data transmission.

Example 26

The method of any of examples 19 to 25, wherein the single second indication is indicative of acknowledgement payload size for each of the one or more acknowledgement codebooks, and wherein each of the one or more acknowledgement codebooks is a coded acknowledgement codebook.

Example 27

The method of any of examples 19 to 26, wherein the single second indication is indicative of a single coded acknowledgement payload size for all of the one or more acknowledgement codebooks.

Example 28

The method of any of examples 19 to 27, wherein the multiple transmission acknowledgement messages are each scheduled to be transmitted via separate physical uplink control channel transmissions within the slot.

Example 29

The method of any of examples 19 to 28, wherein the multiple transmission acknowledgement messages are scheduled to be transmitted on a first carrier that has a higher sub-carrier spacing than that of a second carrier used by the uplink data transmission, and wherein the multiple transmission acknowledgement messages are each scheduled to be transmitted via separate physical uplink control channel transmissions within corresponding slots of the first carrier.

Example 30

The method of any of examples 19 to 29, wherein the multiple transmission acknowledgement messages and the uplink data transmission are each associated with a same traffic type.

Example 31

The method of any of examples 19 to 30, wherein the same traffic type is ultra-reliable low-latency communications traffic.

Example 32

The method of any of examples 19 to 31, wherein the same traffic type is enhanced mobile broadband traffic.

Example 33

An apparatus comprising at least one means for performing a method of any of examples 19 to 32.

Example 34

An apparatus for wireless communications comprising a processor; memory coupled with the processor; and instructions stored in the memory and executable by the processor to cause the apparatus to perform a method of any of examples 19 to 32.

Example 35

A non-transitory computer-readable medium storing code for wireless communications, the code comprising instructions executable by a processor to perform a method of any of examples 19 to 32.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:

receiving downlink control information scheduling an uplink shared channel transmission in a slot, wherein the uplink shared channel transmission overlaps with multiple scheduled transmission acknowledgement messages;

determining that a plurality of timing thresholds are satisfied by an earliest of the multiple scheduled transmission acknowledgement messages and the uplink shared channel transmission with respect to a latest downlink data transmission acknowledged by one of the multiple scheduled transmission acknowledgement messages and with respect to the downlink control information scheduling the uplink shared channel transmission;

generating a plurality of acknowledgement codebooks for transmission of the multiple scheduled transmission acknowledgement messages, comprising separately encoding the multiple scheduled transmission acknowledgement messages to corresponding sets of coded bits; and multiplexing, based at least in part on the plurality of timing thresholds being satisfied, the corresponding sets of coded bits with the uplink shared channel transmission.

2. The method of claim 1, wherein determining that the plurality of timing thresholds are satisfied comprises:

determining that a first timing threshold is satisfied by the earliest of the multiple scheduled transmission acknowledgement messages and the uplink shared channel transmission being at least a first predetermined number of symbols after a last symbol of the latest downlink data transmission acknowledged by one of the multiple scheduled transmission acknowledgment messages; and determining that a second timing threshold is satisfied by the earliest of the multiple scheduled transmission acknowledgement messages and the uplink shared channel transmission being at least a second predetermined number of symbols after a last symbol of the downlink control information scheduling the uplink shared channel transmission.

3. The method of claim 2, further comprising:

determining that downlink control information scheduling downlink data transmissions is received before the downlink control information scheduling the uplink shared channel transmission, wherein multiplexing the corresponding sets of coded bits with the uplink shared channel transmission is further based on the downlink control information scheduling the downlink data transmissions being received before the downlink control information scheduling the uplink shared channel transmission.

4. The method of claim 1, wherein the plurality of timing thresholds comprises a first timing threshold with respect to the latest downlink data transmission acknowledged by the one of the multiple scheduled transmission acknowledgement messages, and wherein the plurality of timing thresholds comprises a second timing threshold with respect to the downlink control information scheduling the uplink shared channel transmission.

5. The method of claim 1, further comprising:
determining that downlink control information scheduling the latest downlink data transmission is received after the downlink control information scheduling the uplink shared channel transmission, wherein acknowledgement codebooks corresponding to respective transmission acknowledgement messages associated with the latest downlink data transmission received after the downlink control information scheduling the uplink shared channel transmission are not included in generating the plurality of acknowledgement codebooks.

6. The method of claim 1, further comprising:
receiving a plurality of first indications of acknowledgement payload size, each of the plurality of first indications corresponding to one of the multiple scheduled transmission acknowledgement messages and being received via respective downlink control information messages scheduling downlink data transmissions acknowledged by the multiple scheduled transmission acknowledgement messages; and
receiving a single second indication of acknowledgement payload size via the downlink control information scheduling the uplink shared channel transmission.

7. The method of claim 6, wherein generating the plurality of acknowledgement codebooks for transmission of the multiple scheduled transmission acknowledgement messages comprises:
generating a separate acknowledgement codebook for each of the multiple scheduled transmission acknowledgement messages based on respective ones of the plurality of first indications; and
padding at least one or more of the separate acknowledgement codebooks according to the single second indication to generate a plurality of updated acknowledgement codebooks for multiplexing the corresponding sets of coded bits with the uplink shared channel transmission.

8. The method of claim 7, further comprising:
concatenating each of the plurality of updated acknowledgement codebooks prior to multiplexing the corresponding sets of coded bits with the uplink shared channel transmission.

9. The method of claim 6, wherein generating the plurality of acknowledgement codebooks for transmission of the multiple scheduled transmission acknowledgement messages comprises:
generating a separate acknowledgement codebook for each of the multiple scheduled transmission acknowledgement messages based on respective ones of the plurality of first indications;
concatenating the separate acknowledgement codebooks for each of the multiple scheduled transmission acknowledgement messages; and
applying the single second indication to the concatenated acknowledgement codebooks to generate a single updated acknowledgement codebook for multiplexing the corresponding sets of coded bits with the uplink shared channel transmission.

10. The method of claim 1, wherein the multiple scheduled transmission acknowledgement messages are each scheduled to be transmitted via separate physical uplink control channel transmissions within the slot.

11. The method of claim 1, wherein the multiple scheduled transmission acknowledgement messages are scheduled to be transmitted on a first carrier that has a higher sub-carrier spacing than that of a second carrier used by the uplink shared channel transmission, and wherein the multiple scheduled transmission acknowledgement messages are each scheduled to be transmitted via separate physical uplink control channel transmissions within corresponding slots of the first carrier.

12. The method of claim 1, wherein the multiple scheduled transmission acknowledgement messages and the uplink shared channel transmission are each associated with a same traffic type.

13. A method for wireless communication at a base station, comprising:
transmitting, to a user equipment (UE), downlink control information scheduling an uplink shared channel transmission for the UE during a slot;
transmitting, to the UE, multiple downlink data transmissions that are to be acknowledged by the UE via corresponding multiple transmission acknowledgment messages that are scheduled to at least partially overlap in time with the uplink shared channel transmission; and
receiving, from the UE, a plurality of acknowledgement codebooks corresponding to the multiple transmission acknowledgement messages, wherein receiving the plurality of acknowledgement codebooks corresponding to the multiple transmission acknowledgement messages comprises receiving the multiple transmission acknowledgement messages as acknowledgement codebooks separately encoded to corresponding sets of coded bits, wherein the corresponding sets of coded bits are multiplexed with the uplink shared channel transmission based at least in part on a plurality of timing thresholds being satisfied by an earliest of the multiple transmission acknowledgement messages and the uplink shared channel transmission with respect to a latest downlink data transmission of the multiple downlink data transmissions and the downlink control information scheduling the uplink shared channel transmission.

14. The method of claim 13, wherein the plurality of timing thresholds comprise a first timing threshold and a second timing threshold, the first timing threshold being satisfied by the earliest of the multiple transmission acknowledgement messages and the uplink shared channel transmission being at least a first predetermined number of symbols after a last symbol of the latest downlink data transmission of the multiple downlink data transmissions, and the second timing threshold being satisfied by the earliest of the multiple transmission acknowledgement messages and the uplink shared channel transmission being at least a second predetermined number of symbols after a last symbol of the downlink control information scheduling the uplink shared channel transmission.

15. The method of claim 14, wherein: receiving the plurality of acknowledgement codebooks corresponding to the multiple transmission acknowledgement messages is further based on downlink control information scheduling the multiple downlink data transmissions being received at the UE before the downlink control information scheduling the uplink shared channel transmission.

16. The method of claim 13, wherein the plurality of timing thresholds comprises a first timing threshold with respect to the latest downlink data transmission acknowledged by the one of the multiple scheduled transmission acknowledgement messages, and wherein the plurality of timing thresholds comprises a second timing threshold with respect to the downlink control information scheduling the uplink shared channel transmission.

17. The method of claim 13, further comprising:
transmitting a downlink control information scheduling at least one of the multiple downlink data transmissions such that the downlink control information is received at the UE after the downlink control information scheduling the uplink shared channel transmission, wherein ones of the multiple transmission acknowledgement messages that are responsive to the at least one of the multiple downlink data transmissions are not included in the corresponding sets of coded bits multiplexed with the uplink shared channel transmission received from the UE.

18. The method of claim 13, further comprising:
transmitting a plurality of first indications of acknowledgement payload size, each of the plurality of first indications corresponding to one of the multiple transmission acknowledgement messages and being transmitted via respective downlink control information messages scheduling the multiple downlink data transmissions; and
transmitting a single second indication of acknowledgement payload size via the downlink control information scheduling the uplink shared channel transmission.

19. The method of claim 18, wherein the single second indication is indicative of acknowledgement payload size for each of the plurality of acknowledgement codebooks, and wherein each of the plurality of acknowledgement codebooks is a coded acknowledgement codebook.

20. The method of claim 18, wherein the single second indication is indicative of a single coded acknowledgement payload size for all of the plurality of acknowledgement codebooks.

21. The method of claim 18, wherein the multiple transmission acknowledgement messages are each scheduled to be transmitted via separate physical uplink control channel transmissions within the slot.

22. The method of claim 18, wherein the multiple transmission acknowledgement messages are scheduled to be transmitted on a first carrier that has a higher sub-carrier spacing than that of a second carrier used by the uplink shared channel transmission, and wherein the multiple transmission acknowledgement messages are each scheduled to be transmitted via separate physical uplink control channel transmissions within corresponding slots of the first carrier.

23. The method of claim 18, wherein the multiple transmission acknowledgement messages and the uplink shared channel transmission are each associated with a same traffic type.

24. An apparatus for wireless communication, comprising:
a processor;
memory coupled with the processor; and
instructions stored in the memory and executable by the processor to cause the apparatus to:
receive downlink control information scheduling an uplink shared channel transmission in a slot, wherein the uplink shared channel transmission overlaps with multiple scheduled transmission acknowledgement messages;
determine that a plurality of timing thresholds are satisfied by an earliest of the multiple scheduled transmission acknowledgement messages and the uplink shared channel transmission with respect to a latest downlink data transmission acknowledged by one of the multiple scheduled transmission acknowledgement messages and with respect to the downlink control information scheduling the uplink shared channel transmission;
generate a plurality of acknowledgement codebooks for transmission of the multiple scheduled transmission acknowledgement messages, comprising separately encoding the multiple scheduled transmission acknowledgement messages to corresponding sets of coded bits; and
multiplex, based at least in part on the plurality of timing thresholds being satisfied, the corresponding sets of coded bits with the uplink shared channel transmission.

25. The apparatus of claim 24, wherein the instructions to determine satisfaction of the plurality of timing thresholds are executable by the processor to cause the apparatus to:
determine that a first timing threshold is satisfied by the earliest of the multiple scheduled transmission acknowledgement messages and the uplink shared channel transmission being at least a first predetermined number of symbols after a last symbol of the latest downlink data transmission acknowledged by one of the multiple scheduled transmission acknowledgment messages; and
determine that a second timing threshold is satisfied by the earliest of the multiple scheduled transmission acknowledgement messages and the uplink shared channel transmission being at least a second predetermined number of symbols after a last symbol of the downlink control information scheduling the uplink shared channel transmission.

26. The apparatus of claim 25, wherein the instructions are further executable by the processor to cause the apparatus to:
determine that downlink control information scheduling downlink data transmissions is received before the downlink control information scheduling the uplink shared channel transmission, wherein multiplexing the corresponding sets of coded bits with the uplink shared channel transmission is further based on the downlink control information scheduling the downlink data transmissions being received before the downlink control information scheduling the uplink shared channel transmission.

27. The apparatus of claim 24, wherein the plurality of timing thresholds comprises a first timing threshold with respect to the latest downlink data transmission acknowledged by the one of the multiple scheduled transmission acknowledgement messages, and wherein the plurality of timing thresholds comprises a second timing threshold with respect to the downlink control information scheduling the uplink shared channel transmission.

28. The apparatus of claim 24, wherein the instructions are further executable by the processor to cause the apparatus to:
determine that downlink control information scheduling the latest downlink data transmission is received after the downlink control information scheduling the uplink shared channel transmission, wherein acknowledgement codebooks corresponding to respective transmission acknowledgement messages associated with the latest downlink data transmission received after the downlink control information scheduling the uplink shared channel transmission are not included in generating the plurality of acknowledgement codebooks.

29. An apparatus for wireless communication, comprising:
- a processor;
- memory coupled with the processor; and
- instructions stored in the memory and executable by the processor to cause the apparatus to:
  - transmit, to a user equipment (UE), a downlink control information scheduling an uplink shared channel transmission for the UE during a slot;
  - transmit, to the UE, multiple downlink data transmissions that are to be acknowledged by the UE via corresponding multiple transmission acknowledgment messages that are scheduled to at least partially overlap in time with the uplink shared channel transmission; and
  - receive, from the UE, a plurality of acknowledgement codebooks corresponding to the multiple transmission acknowledgement messages, wherein receiving the plurality of acknowledgement codebooks corresponding to the multiple transmission acknowledgement messages comprises receiving the multiple transmission acknowledgement messages as acknowledgement codebooks separately encoded to corresponding sets of coded bits, wherein the corresponding sets of coded bits are multiplexed with the uplink shared channel transmission based at least in part on a plurality of timing thresholds being satisfied by an earliest of the multiple transmission acknowledgement messages and the uplink shared channel transmission with respect to a latest downlink data transmission of the multiple downlink data transmissions and the downlink control information scheduling the uplink shared channel transmission, and wherein receiving the plurality of acknowledgement codebooks corresponding to the multiple transmission acknowledgement messages and multiplexed with the uplink shared channel transmission comprises receiving the multiple transmission acknowledgement messages as separately encoded acknowledgement codebooks.

30. The apparatus of claim 29, wherein the plurality of timing thresholds comprises a first timing threshold with respect to the latest downlink data transmission acknowledged by the one of the multiple scheduled transmission acknowledgement messages, and wherein the plurality of timing thresholds comprises a second timing threshold with respect to the downlink control information scheduling the uplink shared channel transmission.

\* \* \* \* \*